(12) United States Patent  
Vanryckeghem

(10) Patent No.: US 11,493,142 B2
(45) Date of Patent: Nov. 8, 2022

(54) FAILSAFE ELECTRIC VALVE ACTUATOR

(71) Applicant: FMC Technologies, Sens (FR)

(72) Inventor: Charles Vanryckeghem, Ligny le Chatel (FR)

( * ) Notice: Subject to any disclaimer, the term of this patent is extended or adjusted under 35 U.S.C. 154(b) by 388 days.

(21) Appl. No.: 16/627,692

(22) PCT Filed: Jul. 2, 2018

(86) PCT No.: PCT/EP2018/067854
§ 371 (c)(1),
(2) Date: Dec. 30, 2019

(87) PCT Pub. No.: WO2019/002632
PCT Pub. Date: Jan. 3, 2019

(65) Prior Publication Data
US 2020/0158251 A1 May 21, 2020

(30) Foreign Application Priority Data
Jun. 30, 2017 (WO) ................ PCT/FR2017/051787

(51) Int. Cl.
*F16K 31/56* (2006.01)
*F16K 31/04* (2006.01)
*E21B 34/02* (2006.01)
*F16K 3/02* (2006.01)

(52) U.S. Cl.
CPC ............ *F16K 31/047* (2013.01); *E21B 34/02* (2013.01); *F16K 3/0254* (2013.01); *F16K 31/56* (2013.01)

(58) Field of Classification Search
CPC ........ F16K 31/047; F16K 3/0254; F16K 31/56; E21B 34/02; E21B 33/0355; E21B 34/04
See application file for complete search history.

(56) References Cited

U.S. PATENT DOCUMENTS

| 3,324,741 | A | | 6/1967 | Anderson | |
|---|---|---|---|---|---|
| 5,983,743 | A | * | 11/1999 | McGregor | ............ F16D 27/105 251/129.13 |
| 5,996,485 | A | * | 12/1999 | Suter | ......................... A23N 1/00 426/489 |

(Continued)

FOREIGN PATENT DOCUMENTS

| EP | 1 210 538 B1 | 5/2003 | |
|---|---|---|---|
| EP | 1333207 B1 * | 8/2005 | ........... F16K 31/047 |

(Continued)

*Primary Examiner* — Marina A Tietjen

(57) ABSTRACT

Electric valve actuator, comprising: a stem (41, 43) for moving a valve member between open and closed positions; a drive assembly for moving the stem comprising an electric motor (31); a biasing assembly (5) adapted to act on the stem to urge it toward a failsafe position; and a fail-safe shutdown system to allow the biasing assembly to urge the stem toward the failsafe position, comprising a first latching unit (7) mounted movable in translation in the housing and a second latching unit (8) mounted on the housing for latching engagement with the first unit, whereby the stem can be moved free from the action of the biasing assembly in the latched state of the first and second latching units; and the drive assembly and the stem are mounted integral in translation with the first unit (7), which is mounted integral in translation with the biasing assembly.

39 Claims, 14 Drawing Sheets

(56) References Cited

U.S. PATENT DOCUMENTS

| | | | |
|---|---|---|---|
| 6,572,076 B1* | 6/2003 | Appleford | F16K 31/047 |
| | | | 251/69 |
| 2013/0291946 A1* | 11/2013 | Young | F16K 3/0254 |
| | | | 251/12 |
| 2015/0184767 A1 | 7/2015 | Oswald | |

FOREIGN PATENT DOCUMENTS

| | | | |
|---|---|---|---|
| GB | 1159065 A | 7/1969 | |
| WO | WO-03056221 A1 * | 7/2003 | F16K 31/003 |

* cited by examiner

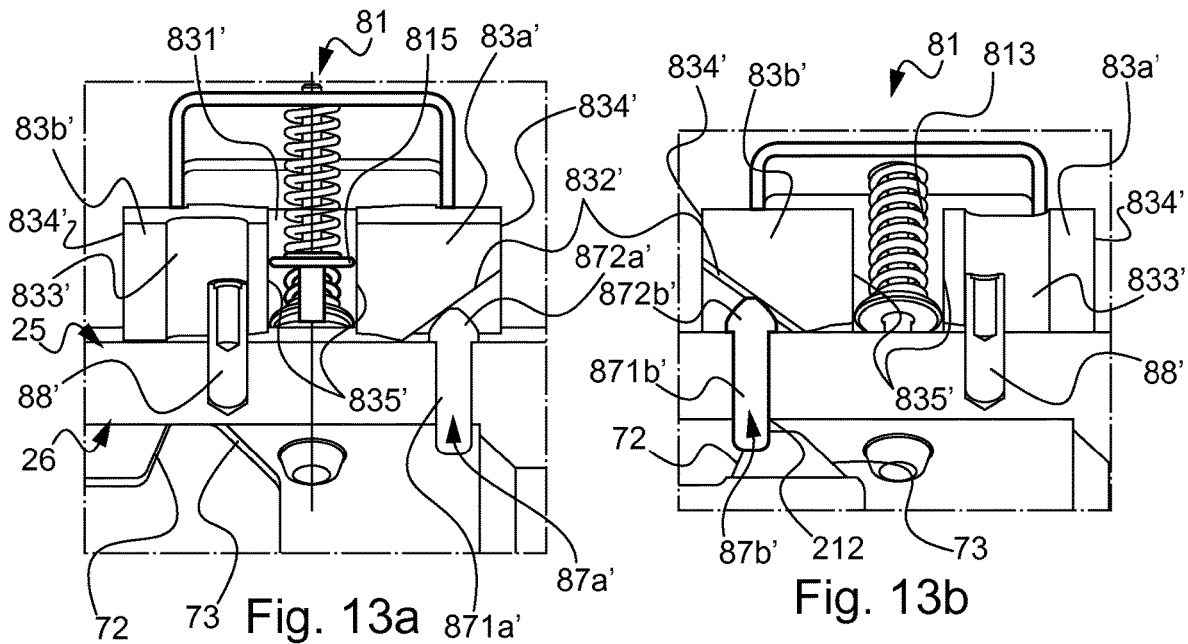
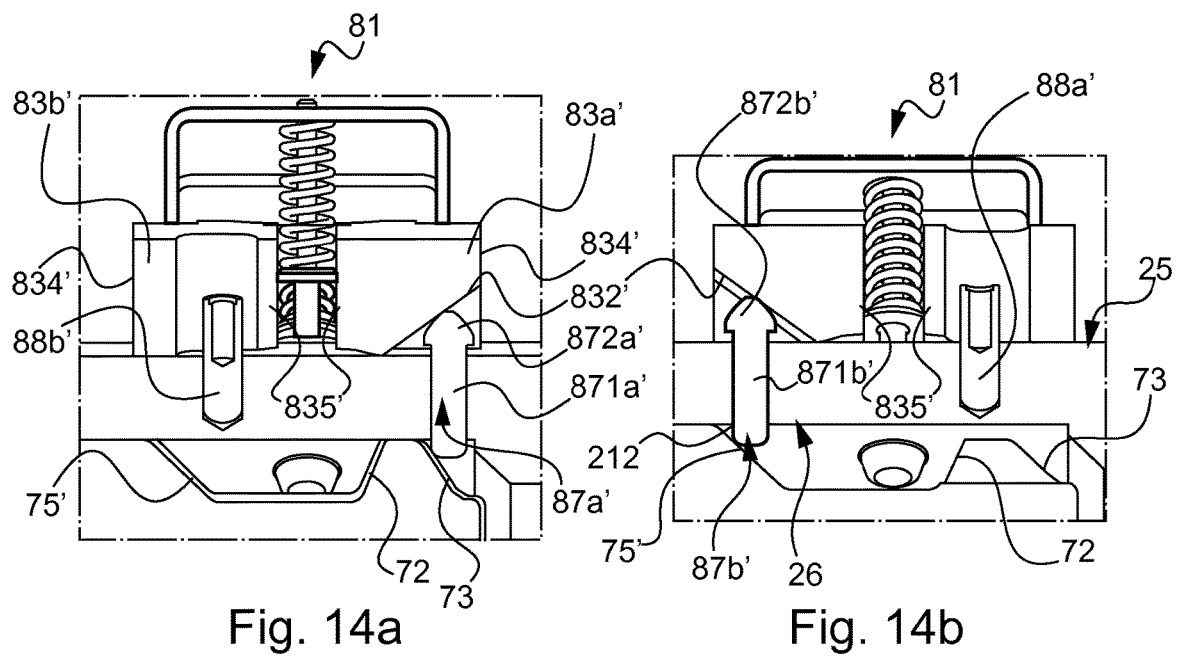

FAILSAFE ELECTRIC VALVE ACTUATOR

TECHNICAL FIELD

The invention relates to the technical field of electric actuators which are intended to open and close actuated gate valves. The invention is particularly adapted for actuated gate valves for wellheads and Christmas trees for example.

BACKGROUND OF THE INVENTION

While a variety of power-operated actuators are available, especially those using gas or hydraulic pressure, electric actuators' main drawback is their high electric power consumption. Indeed, electric actuators generally use one or several motors for opening and closing the valve. Moreover, if for whatever reason the valve is to be kept at a certain position, electric power is generally needed to maintain the valve at said position. All this generates an important power consumption discouraging users to adopt the electric solution.

Furthermore, safety standards require the use of a surface or subsea safety valve to provide fast response valve closure for isolating the well in the event of an emergency.

Indeed, given the high values of the forces which are usually at stake, a fail-safe mechanism, also simply called "fail-safe", is generally used in order to be able to open or close the valve under emergency circumstances. An emergency circumstance may occur if a power failure happens for example. In this case, the fail-safe is activated and the valve is set at its fail-safe position. This prevents from accidents which can be for example caused by the fact that the gate valve is open when an emergency circumstance occurs causing a loss of control of the gate valve.

Presently, the more usual fail-safe actuators present on the market are hydraulic or pneumatic. The fail-safe mechanism is powered by a spring (coil spring or Belleville spring). The fail-safe spring is energized by a hydraulic or pneumatic piston during each operating sequence. This spring will provide the power to perform the linear motion for the return and/or the fail-safe sequence.

A fail-safe valve actuator powered by an electric motor is disclosed in US 2015/0184767. The actuator includes a drive unit which can be moved to and fro. A return spring is operable on the drive unit to urge the actuating stem towards a datum position. A latch is used to maintain said drive unit in a predetermined position. The latch comprises a bracket, means for biasing said bracket to an angular position and a hammer arranged to be held against the force of an operating spring by an electromagnet and is moveable once the electromagnet is de-energized.

The drive unit, the return spring and the latch are all disposed in a same block making thus the assembly of the actuator disclosed in US 2015/0184767 complex. Moreover, the fail-safe requires the use of a succession of levers for the latching and unlatching operations. Hence, it necessitates a succession of interactions between many parts during the fail-safe closure, meaning that a part failure can cause the failure of the whole assembly. Furthermore, the electromagnet sustains the load of the drive unit and the latching mechanism which puts it under a lot of mechanical stresses.

The present invention generally relates to a provision making it possible to simplify the structure of a failsafe electric valve actuator and furthermore leading to other advantages.

BRIEF SUMMARY OF THE INVENTION

In a first aspect of the present invention, it is provided a fail-safe electric valve actuator for a valve in line, comprising:
  a housing for mounting on a gate valve body, at a first end of the housing;
  a stem mounted movable in translation in the housing for moving a valve member of the valve between valve open and valve closed positions;
  a drive assembly for moving the stem in translation, the drive assembly comprising an electric motor and a drive connection from the motor to the stem, to convert rotary motion of the motor to translation motion of the stem;
  a biasing assembly adapted to act on the stem to urge it toward a failsafe position; and
  a fail-safe shutdown system to selectively release the stem from the position in which it was placed by the drive assembly, to allow the biasing assembly to urge the stem toward the failsafe position, the shutdown assembly comprising a first latching unit mounted movable in translation in the housing and a second latching unit mounted on the housing for latching engagement with the first latching unit, whereby the stem can be moved free from the action of the biasing assembly in the latched state of the first and second latching units;
  characterized in that the drive assembly and the stem are mounted integral in translation with the first latching unit, on a part of the first latching unit which projects from the housing at a second end of this housing opposite to said first end and is mounted integral in translation with the biasing assembly.

The present invention hence provides an electric gate valve actuator comprising a simple fail-safe mechanism. Indeed, the stem and the drive assembly being mounted integral to the first latching unit and the biasing assembly being mounted integral to the first latching unit, the actuator works in "line", which simplifies the mechanism and its assembly. The actuation of the gate valve is thus possible while simply securing the gate valve closure in case of an emergency. Moreover, the fail-safe actuator presents the advantages of being power and hence cost efficient.

According to another aspect of the invention, it is provided a fail-safe electric valve actuator for a valve in line, comprising:
  a housing for mounting on a gate valve body, at a first end of the housing;
  a stem mounted movable in translation in the housing for moving a valve member of the valve between valve open and valve closed positions;
  a drive assembly for moving the stem in translation, the drive assembly comprising an electric motor and a drive connection from the motor to the stem, to convert rotary motion of the motor to translation motion of the stem;
  a biasing assembly adapted to act on the stem to urge it toward a failsafe position; and
  a fail-safe shutdown system to selectively release the stem from the position in which it was placed by the drive assembly, to allow the biasing assembly to urge the stem toward the failsafe position, the shutdown assembly comprising a first latching unit mounted movable in translation in the housing and a second latching unit mounted on the housing for latching engagement with the first latching unit, whereby the stem can be moved free from the action of the biasing assembly in the latched state of the first and second latching units;

characterized in that the second latching unit comprises at least one latching dog mounted movable in translation on the housing, the housing is provided with a hole for the passage of the latching dog and the first latching unit comprises a stop for latching engagement with the latching dog; the latching dog comprises a rod portion extended by a diametrically wider head portion for latching engagement with the stop of the first latching unit and the second latching unit furthermore comprises a ring mounted movable in rotation on the housing and having at least one passage having a keyhole shape and communicating with the hole in the housing, the slot portion of the keyhole passage allowing the passage of the rod portion of the latching dog but forming a stop for its head portion to block the head portion of the latching dog in latching engagement with the first latching unit, whereas the cylindrical portion of the keyhole passage allows the passage of the head portion of the latching dog, the fail-safe shutdown system furthermore comprising biasing means for urging the ring in rotation toward a position in which the hole in the housing is aligned with the cylindrical portion of the keyhole passage, whereby the first latching unit can be moved toward the failsafe position under the effect of the biasing assembly.

According to advantageous provisions of the first aspect of the invention, which may be combined:

The second latching unit comprises at least one latch dog mounted movable in translation on the housing, the housing is provided with a hole for the passage of the latching dog and the first latching unit comprises a stop for latching engagement with the latching dog.

The second latching unit comprises a biasing element for urging the latching dog toward the stop of the first latching unit, whereas the stop on the first latching unit forms a first ramp adapted to lift the latch dog against the effect of the biasing element when the first latching unit is moved toward the failsafe position under the effect of the biasing assembly.

The latch dog comprises a rod portion extended by a diametrically wider head portion for latching engagement with the stop of the first latching unit and the second latching unit comprises a ring mounted movable in rotation on the housing and having at least one passage having a keyhole shape and communicating with the hole in the housing, the slot portion of the keyhole passage allowing the passage of the rod portion of the latching dog but forming a stop for its head portion to block the head portion of the latching dog in latching engagement with the first latching unit, whereas the cylindrical portion of the keyhole passage allows the passage of the head portion of the latching dog, the fail-safe shutdown system furthermore comprising biasing means for urging the ring in rotation toward a position in which the hole in the housing is aligned with the cylindrical portion of the keyhole passage, whereby the first latching unit can be moved toward the failsafe position under the effect of the biasing assembly.

The biasing means comprise a torsion spring.

The fail-safe shutdown system comprises electromagnetic means operatively linked to the biasing means so as to prevent rotation of the ring under the action of the biasing means when energized and allow this rotation on de-energization.

The electromagnetic means comprise an electromagnet having a first portion mounted integral with the housing and a second portion mounted integral with the biasing means.

The stop on the first latching unit comprises a second ramp facing away from the first ramp and adapted to lift the latching dog when the first latching unit moves in a direction opposite to the movement toward the failsafe position, the second latching unit comprises a movement transformation element mounted movable in translation in a hole made in the housing and having and end adapted to cooperate with the second ramp to lift the element when the first latching unit moves in the direction opposite to the movement toward the failsafe position, and an opposite end having a ramp adapted to cooperate with a lateral projection of the ring when lifted by the first latching unit, so as to cause the ring to rotate in a direction opposite to that imparted by the biasing means, against the force exerted by the latter, to position the slot portion of the ring over the hole in the housing and allow re-energization of the electromagnetic means.

The latch dog comprises a rod portion extended by a diametrically wider head portion for latching engagement with the stop of the first latching unit and the second latching unit comprises a ring mounted on the housing and having a right part and a left part having respectively at least one right cavity and at least one left cavity forming together at least one passage for the latching dog in a first position of the ring in which the right part and the left part abut against each other, first position in which the at least one passage communicates with the hole in the housing and allows the passage of the rod portion of the latching dog but forms a stop for its head portion to block the head portion of the latching dog in latching engagement with the first latching unit, the fail-safe shutdown system furthermore comprising biasing means for causing the right part and left part of the ring to move away from each other toward a position in which the stop can lift the latching dog, whereby the first latching unit can be moved toward the failsafe position under the effect of the biasing assembly.

The fail-safe shutdown system comprises electromagnetic means operatively linked to the biasing means so as to prevent separation of the right part and the left part of the ring under the action of the biasing means when energized and allow this separation on de-energization.

The second latching unit comprises on both sides of the ring two mobile support disks mounted on the housing, and the electromagnet means having a first portion and a second portion respectively arranged on one of the support disks, the first portion being attracted to the second portion when the actuator is energized making the latching dog rest against the first ramp of the first latching unit and preventing the right part and the left part to be separated.

The second latching unit comprises at least one compression spring mounted perpendicularly to the mobile support disks so as to move away from each other the left part and the right part of the ring on de-energization.

The stop on the first latching unit comprises a second ramp facing away from the first ramp and adapted to lift the latching dog when the first latching unit moves in a direction opposite to the movement toward the failsafe position, the second latching unit comprises at least one movement transformation element mounted movable in translation in a hole made in the housing and having a lower end adapted to cooperate with a ramp of the first latching unit to lift the element when the first latching unit moves in the direction opposite to the movement toward the failsafe position, and an opposite end adapted to cooperate with a notch of the ring when lifted by the first latching unit, so as to cause the right part and the left part of the ring to move towards the first position and allow re-energization of the electromagnetic means.

The second latching unit comprises several movement transformation elements including at least one right movement transformation element and at least one left movement transformation element, the movement transformation elements being arranged in zig zag fashion alternatively on the right part and the left part of the ring.

The first latching unit further comprises a third ramp facing the first ramp, and on re-energization the second ramp of the first latching unit successively lifts the latching dog and the at least one right movement transformation element and the third ramp lifts the at least one left movement transformation element while the first latching unit moves in a direction opposite to the movement toward the failsafe position.

The second latching unit comprises at least one pin protruding from the housing and penetrating into a recess of one of the right and left parts of the ring to cooperate with said recess so as to limit the translation movement of the corresponding part of the ring on the housing.

The drive assembly is adapted to move the first latching unit in a direction opposite to that moving it toward the failsafe position, the stem comprising a stop adapted to cooperate with a seat of the valve body, so as to enable this opposite direction movement of the first latching unit.

The drive connection comprises, for moving the stem in translation, a drive nut in engagement with a thread in an outer surface of the stem.

The drive connection comprises means for transmitting the torque from the electric motor to the drive nut, such as a coaxial gearbox followed by a parallel gear cascade, at least one chain or at least one belt.

The first latching unit has a tubular shape and the drive nut is translationally fixed with respect to the first latching unit, inside the latter.

The biasing assembly comprises at least one spring mounted between two parallel support plates, the first one of which is fixed to the housing and the second one being operatively linked to the first latching unit to urge the stem toward the failsafe position under the action of the spring or the springs.

The first plate and the drive means comprise complementary guiding means for guiding the translation movement of the drive assembly.

A damper is associated to each the spring of the biasing assembly.

The stem comprises two parts linked by a knuckle joint.

The actuator is a surface or a subsea electric actuator.

A limit switch sensor is arranged on the drive connection.

A linear variable displacement transducer is arranged on the housing and attached to the biasing assembly.

Load sensors are arranged next to the drive nut.

Those advantageous provisions can also be applied to the other aspect of the invention, if not yet defined above for this aspect.

BRIEF DESCRIPTION OF THE DRAWINGS

Other particularities and advantages of the invention will also emerge from the following description.

In the accompanying drawings, given by way of non-limiting examples:

FIGS. 13a, 14a, 15a and 16a are cut-off views along a first plan of the ring during the re-energizing process; and FIGS. 13b, 14b, 15b and 16b are cut-off views along a second plan of the ring during the re-energizing process.

DETAILED DESCRIPTION OF THE INVENTION

As used in this specification, the words "comprises", "comprising", and similar words, are not to be interpreted in an exclusive or exhaustive sense. In other words, they are intended to mean "including, but not limited to".

Figure 1:
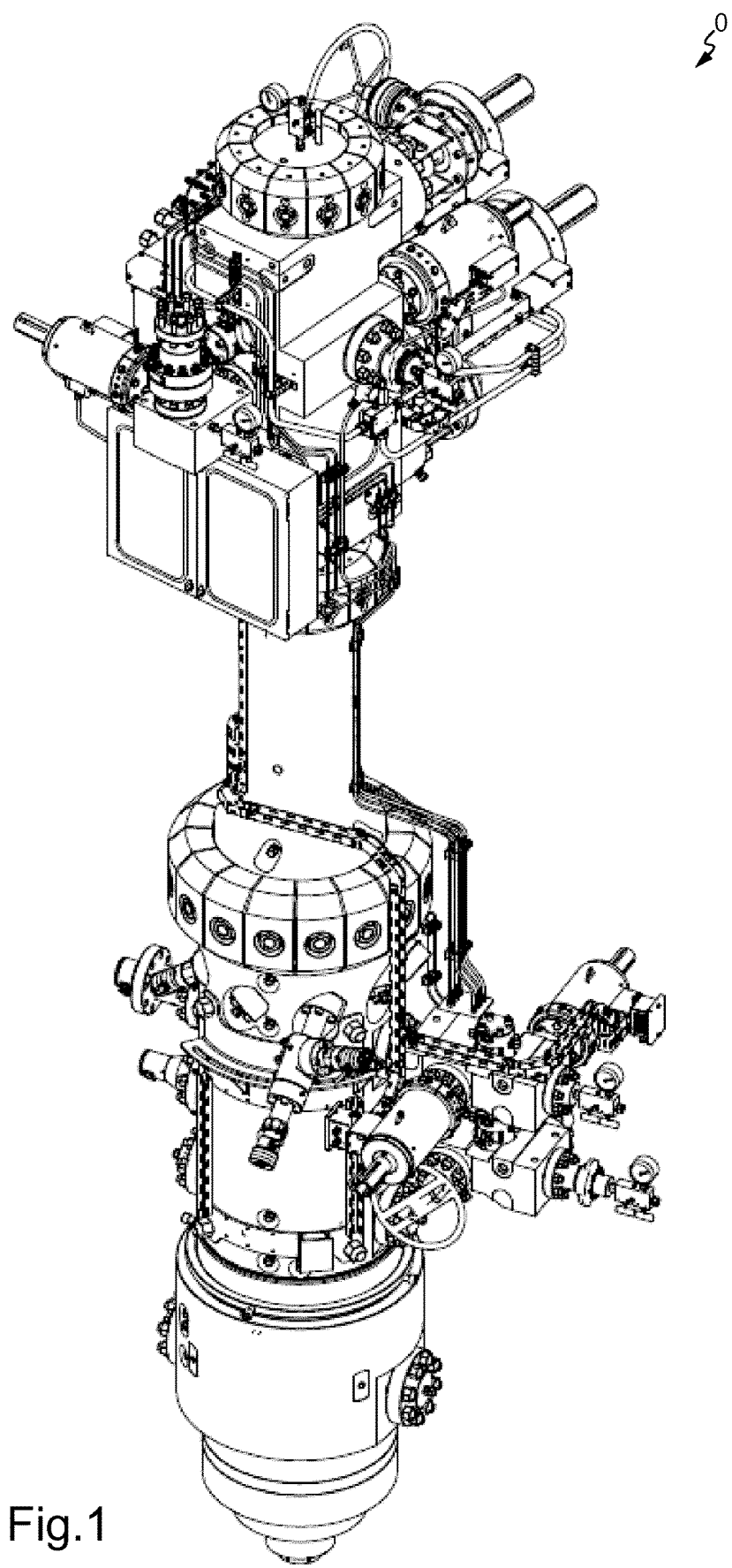
FIG. 1 is a perspective view of an assembly of a wellhead and a Christmas tree.

FIG. 1 illustrates an assembly 0 comprising a wellhead and a Christmas tree to which an actuator A according to the present invention can be fixed. A "Christmas tree" refers to an assembly of gate valves, spools and connections used in petroleum or natural gas extraction.

As of now, the main components of the electric actuator A according to an embodiment of the present invention will now be discussed.

The actuator A comprises a housing 2 for mounting on a body of a valve 1, a drive assembly 3 and stems for opening and closing the valve 1 as well as a biasing assembly 5 and a fail-safe shutdown system mounted to the housing 2 to secure the valve 1 in the case of a power failure or the like. The valve 1 is here a gate valve. The drive assembly 3 comprises here an electric motor 31, as well as different transmissions and a drive nut forming a drive connection 32.

Figure 2:
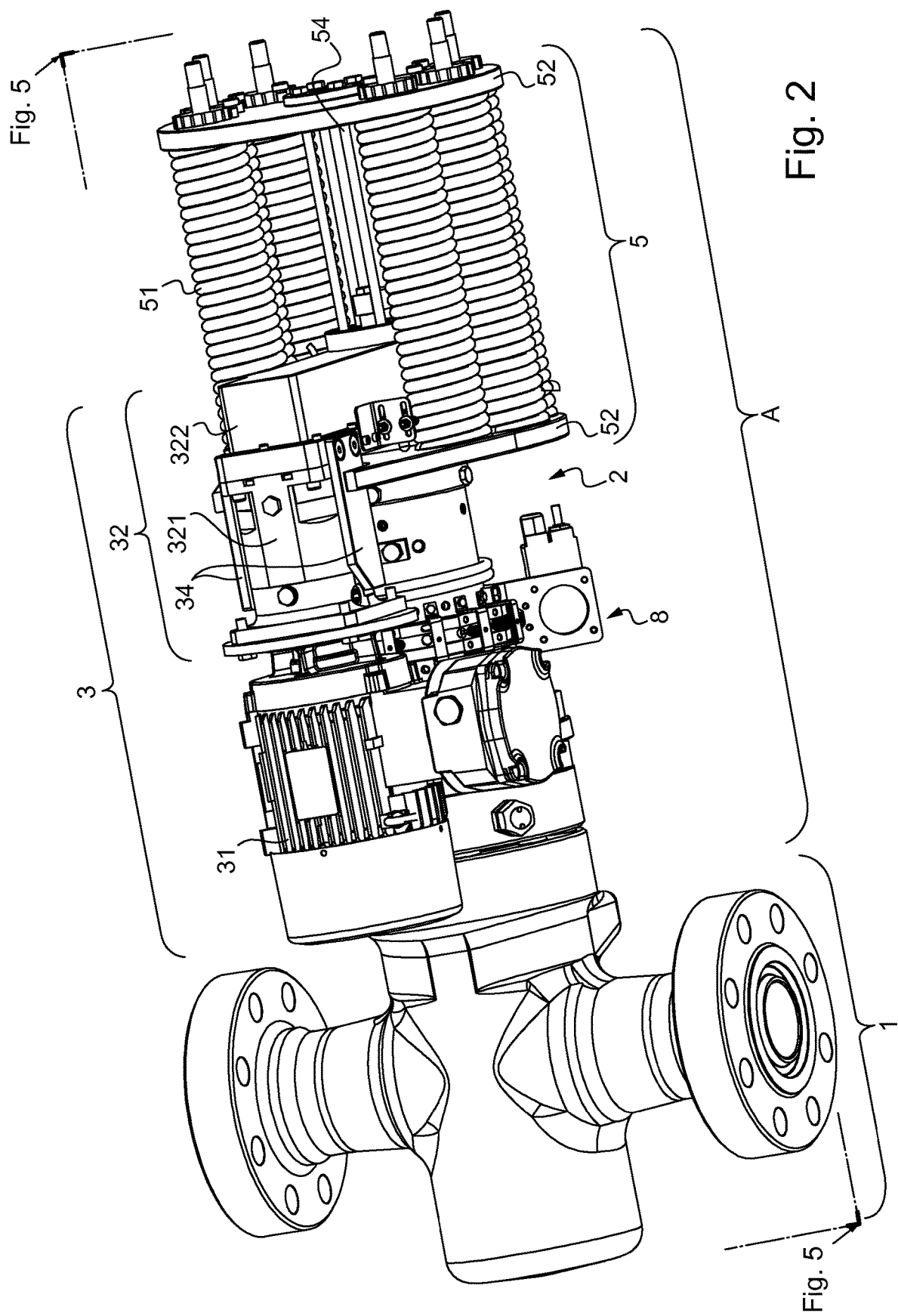
FIG. 2 is a perspective view of an embodiment of an electric actuator fixed to a gate valve.

As shown in FIG. 2, the actuator A is fixed to the gate valve 1. The electric motor 31 is arranged in cantilevered fashion to a primary transmission 321 and a secondary transmission 322 and is used for supplying power to actuate the valve 1. The primary transmission 321, the secondary transmission 322 and the electric motor 31 all form one block which can slide to and fro advantageously with guiding means 34 (plates sliding in a cutout made in a plate 52 described below).

Figure 3:
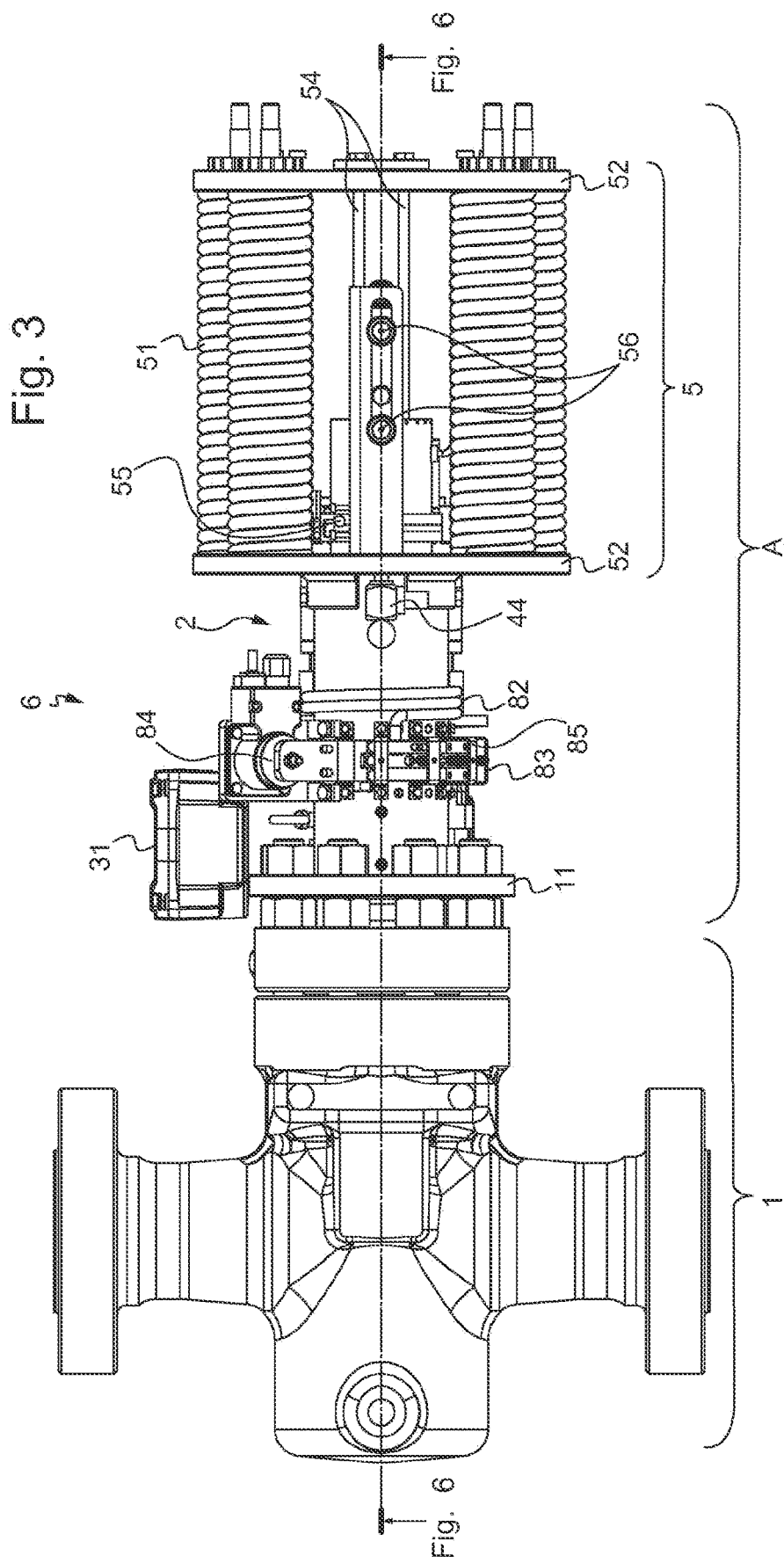
FIG. 3 is a front view of the embodiment of FIG. 2.

Based on FIG. 2 and FIG. 3, a general presentation of how the actuator A operates is developed hereafter followed by a more detailed explanation.

To actuate the gate valve 1, the electric motor 31 torque is transformed into a higher torque via the primary transmission 321 and the secondary transmission 322. Then, the rotary motion is transformed into a translation one by means of a third transmission. The translation motion of the stems inside the housing 2 hence enables the actuation of the valve 1. Details concerning the drive connection 32 are developed further on in the description.

The electric motor 31 energizes as well the fail-safe shutdown system 6 and the biasing assembly 5. When power supply is ensured, the fail-safe shutdown system 6 is in a latched position and the actuator A is in "normal production mode". And when an emergency shutdown, a loss of power or a lack of power supply occurs, the fail-safe shutdown system selectively (i.e only in one of those three situations) releases the stems from the position in which they were placed to a fail-safe position in order to secure the valve 1.

A typical gate valve adapter kit 11 forms the link between the actuator A and the gate valve 1.

A programmable logic controller is connected to the actuator A via different sensors to control the actuation of the gate valve 1 accordingly (speed, position, etc.).

As of now, a more detailed description of the drive assembly 3 and more importantly of fail-safe shutdown system 6 will be disclosed.

The primary transmission 321, attached to the cantilever-mounted electric motor 31, can be a coaxial gear box (a planetary gearbox for example). The latter is a mechanical system having two degrees of freedom and a reduction notably adapted to the transmission of high torques.

Figure 4:
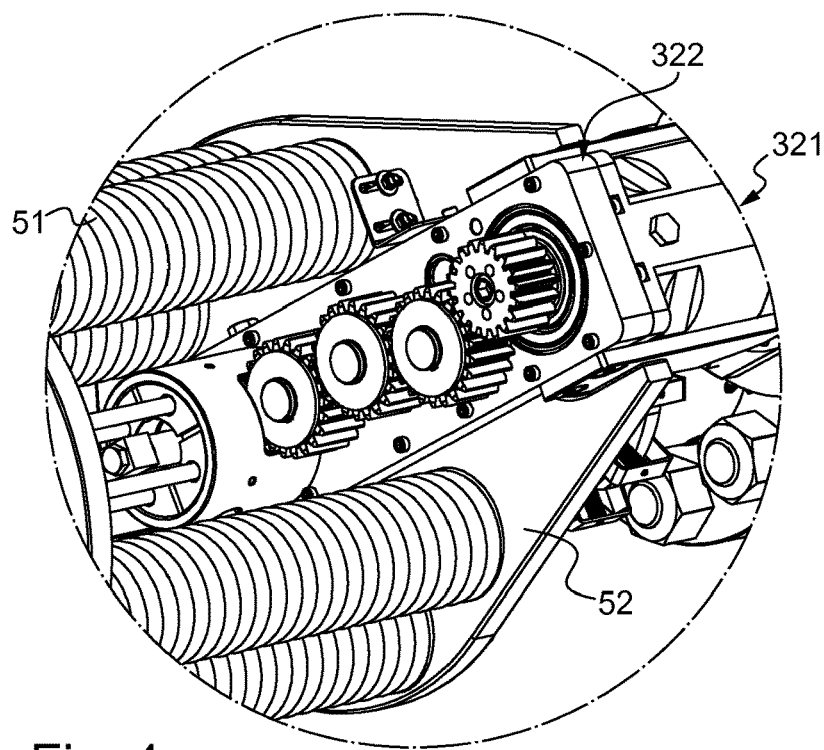
FIG. 4 is a detailed view of an embodiment of the secondary transmission of FIG. 2.

As to the secondary transmission 322, an embodiment is illustrated here in FIG. 4 in the form of a cascade parallel gear box. The secondary transmission 322 is fixed to the primary transmission 321 and enables the transmission of the torque from the electric motor 31. The first gear is removable to be able to install a hand wheel if needed to override the electric motor 31 and drag the gate valve 1 for example.

Figure 5:
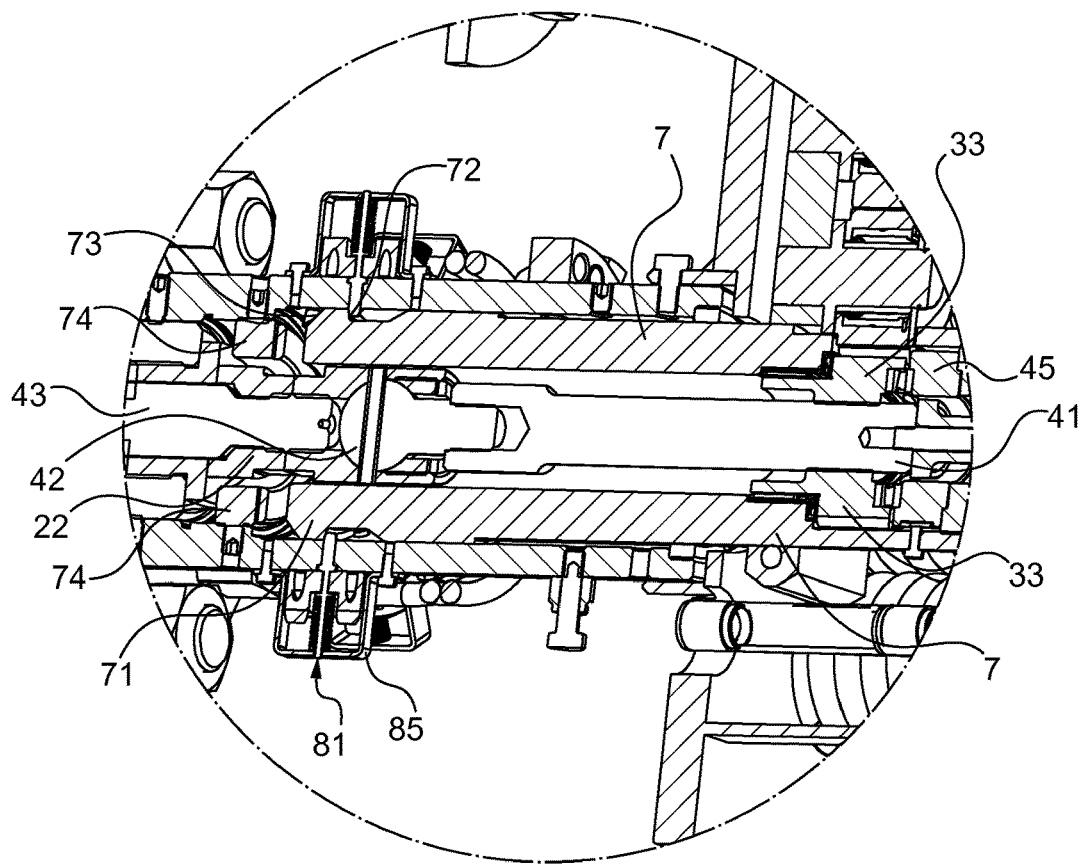
FIG. 5 is a partial cross-sectional view of FIG. 2, showing the stems.

In order to transform the torque into a translation motion, the third transmission, an embodiment of which is represented in FIG. 5, is used. This third transmission comprises an upper stem 41 in the form of a lift screw fitted into a drive nut 33. The drive nut 33 is attached to the secondary transmission 322 which transmits the rotation motion to the drive nut 33. And finally the rotation of the drive nut 33 generates the translation motion of the upper stem 41. As the drive assembly 3 forms a mechanically fastened block, the drive connection 32 and the electric motor 31 can all move in a single unit, by being here advantageously guided by the guiding means 34 on which they slide. The guiding means 34 are designed in such a way that they withstand the force and the rotation generated by the electric motor 31.

The transformation of the rotary motion into a translation motion using a drive nut 33 helps also saving energy.

The drive nut 33 can rotate clockwise and counter clockwise, depending on the direction of rotation of the electric motor 31, to move the upper stem 41 back and forward. However, the upper stem 41 cannot generate the rotation of the drive nut 33, making thus the drive connection 32 an irreversible system. It is also irreversible because of the friction, the pitch and the shape of the upper stem 41 and the drive nut 33.

Bearings, not detailed here, are used to minimize the friction resistance, guide the drive nut 33 and support gate valve axial forces and radial gear loads.

The adapter kit 11 includes an adapter stop 22 (see FIG. 5). It can be adjusted during adapter kit assembly for a perfect gate and seat alignment when the gate valve 1 is in open position and drift tested.

Figure 6A:
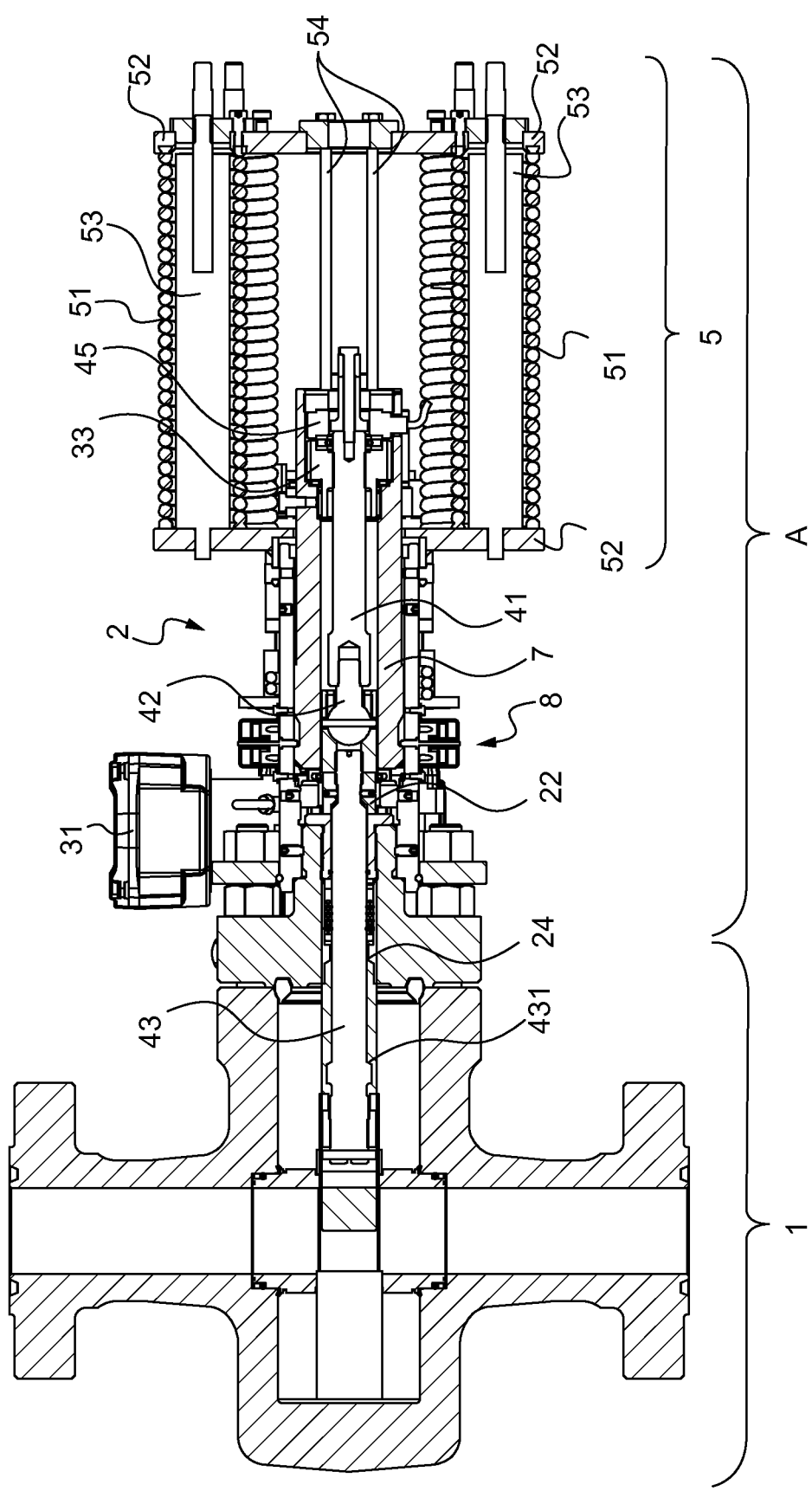
FIG. 6a is a cross-sectional view of FIG. 3, showing the gate valve in the open position.
Figure 6B:
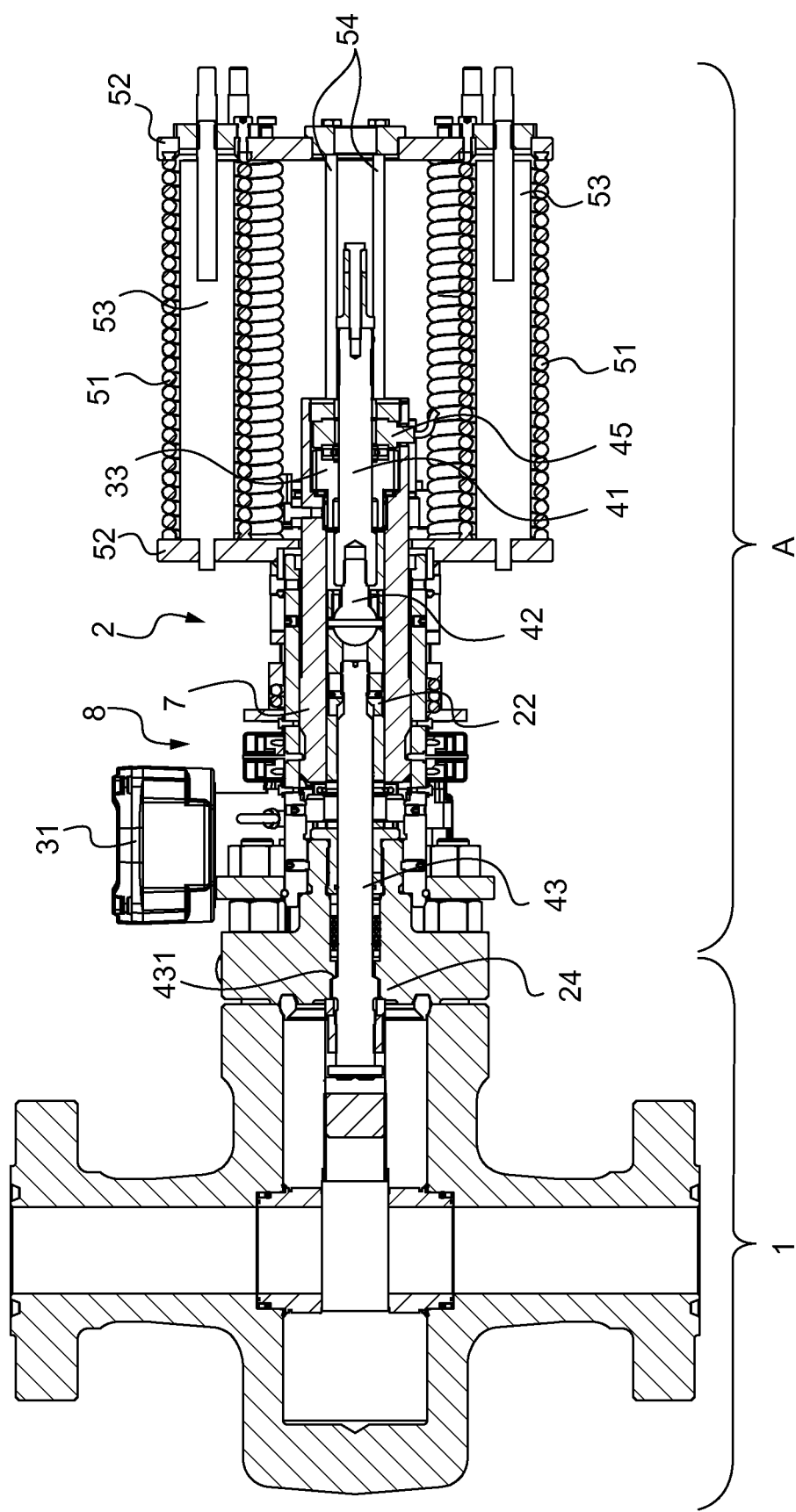
FIG. 6b is cross-sectional view of FIG. 3, showing the gate valve in the closed position.

During the actuation, the electric motor 31 turns in one direction to open the valve 1. The open position is illustrated in FIG. 6a. When the electric motor 31 rotates reverse, the valve 1 is closed as shown in FIG. 6b. Hence, the upper stem 41 moves to and fro, dragging a lower stem 43 which puts the gate valve 1 in one of the two possible positions: the open or the closed one.

As represented in FIGS. 6a and 6b, the lower stem 43 comprises a shoulder called stem back seat 431. When the stem back seat 431 reaches a stop called bonnet back seat 24, the gate valve 1 is in the closed position. Once the upper stem 41 and the lower stem 43 move and the stem back seat 431 is no longer in contact with the bonnet back seat 24, the gate valve 1 strokes to open. The open position is thus reached and controlled by the adapter stop 22.

The same electric motor 31 which moves the drive connection 32 and the stems is used to energize the fail-safe shutdown system 6 and the biasing assembly 5. The biasing assembly 5 energization is made only one time prior to be able to operate the gate valve 1.

As visible on FIGS. 6a and 6b, the springs 51 of the biasing assembly 5 are always energized and compressed when the valve 1 is closed or open in "normal production mode". Thus, less power is consumed because less force is required to the electric motor 31 to operate the gate valve 1 in "normal production mode".

Moreover, the drive connection 32 does not require the electric motor 31 to continuously supply current in order to hold the valve 1 open or closed. When no motion is needed, the electric motor 31 is put on standby and the power consumption is thus once more reduced.

To lower the radial load transfer from the upper stem 41 to the lower stem 43, a knuckle joint 42 is here set between the upper stem 41 and the lower stem 43. This prevents from damage due to excessive torque generated by overloads. The knuckle joint 42 also avoids failure by accommodating potential misalignment of the stems 41 and 43.

In this embodiment, the actuator A comprises two stems but it is obvious that it can comprise more or less stems.

Furthermore, different sensors linked to the programmable logic controller are advantageously used here to monitor the positions and the loads during the motion of the actuator A.

In particular, fail safe spring "energized" limit switches 55, visible on FIG. 3, confirm the activation of the failsafe spring to able or unable the valve to be open.

Both open and closed positions have provision for emergency shutdown limit switches 56 to interface with safety system. The positions are adjustable to accommodate different strokes.

A linear variable displacement transducer also simply called LVDT 44 is also used here for measuring linear displacement (position) of the actuator A.

A load sensor 45 (shown in FIG. 5) can be set as well, behind the drive nut 33, to monitor the drive means axial loads. This sensor gives the rate of valve load, and potential wear indication which enables to prevent potential breakdowns.

The LVDT 44 and the load sensor 45 are installed directly on the stems, meaning that they are not affected by the motion of the other parts of the actuator A. This allows a direct reading of the gate valve 1 position and load.

As of now, the fail-safe closure of the gate valve 1 will be discussed in more details.

As illustrated in FIGS. 6a and 6b, the fail-safe shutdown system comprises a first latching unit 7 mounted movable in translation in the housing 2 and a second latching unit 8 mounted on the housing 2 for latching engagement with the first latching unit 7.

The first latching unit 7 has a tubular shape and comprises a first end and a second end. The first end is intended to cooperate with the second latching unit 8. The second end opposite to the first end is mounted integral to the biasing assembly 5, the drive assembly 3 and the stems on a part which projects from the housing 2.

As to the biasing assembly 5, it comprises springs 51 mounted between two parallel support plates 52, the first one of which is fixed to the housing 2 and the second one being operatively linked to the first latching unit 7 to urge the stems toward the fail-safe position under the action of the springs 51. The springs 51 are in number of six here on this figure, the quantity is reduced or increased based on the gate valve size and force required for the fail-safe actuation. The biasing assembly 5 comprises biasing rods 54 for the operative link to the first latching unit 7 which moves when the springs 51 are compressed or released.

The first latching unit 7 which forms a moving cylinder and the stems can move inside the tubular housing 2 thanks to biasing assembly 5. Thanks to the structure of the first latching unit 7 and the assembly of the drive nut 33 in the housing 2, the translational movements of the drive nut 33 with respect to the first latching unit 7 are prevented.

As mentioned previously, the energization of the biasing assembly 5 is made only one time prior the "normal production operation mode" of the gate valve 1.

Figure 7A:
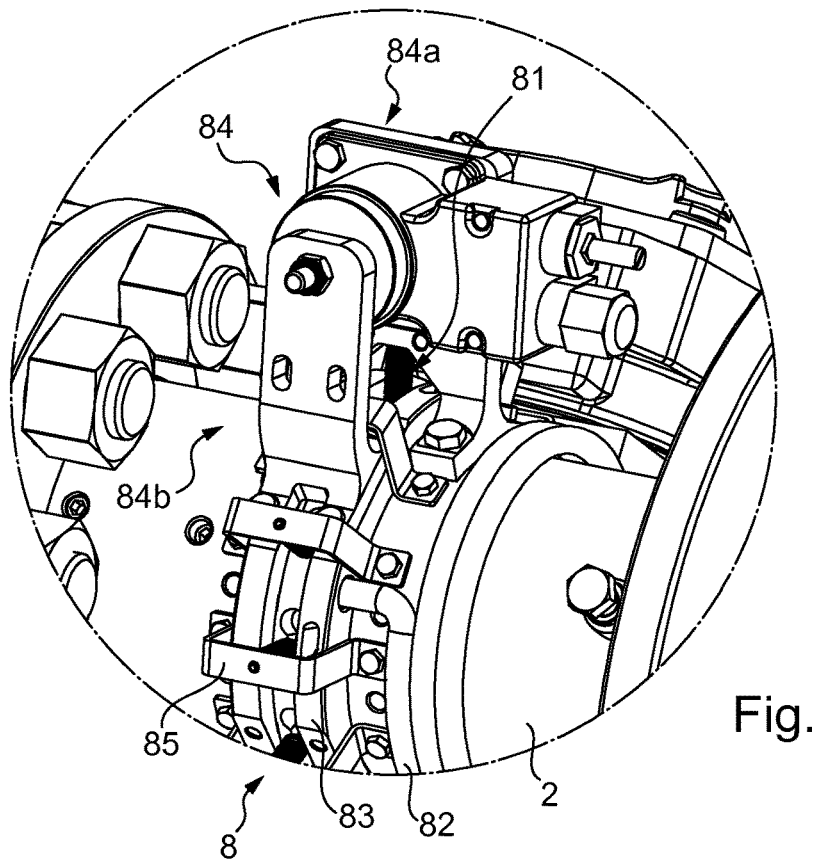
FIG. 7a is a perspective view of the second latching unit in a latched position.
Figure 7B:
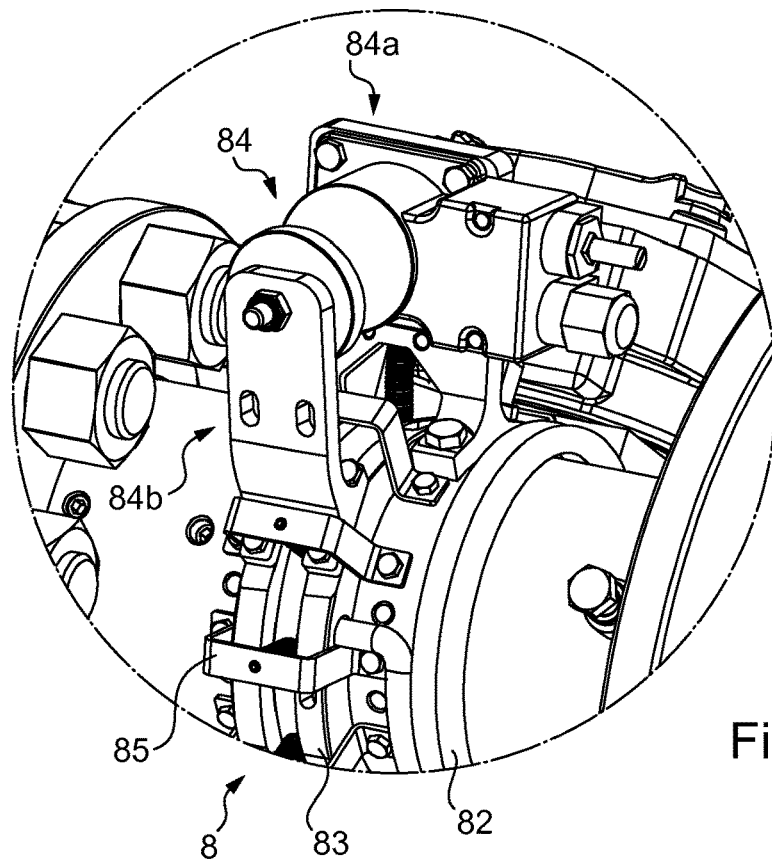
FIG. 7b is a perspective view of the second latching unit in an unlatched position.

Represented in FIGS. 7a and 7b is the second latching unit 8 of the fail-safe shutdown system respectively in two positions: latched and unlatched. The second latching unit 8 comprises here a ring 83, also called revolver ring, mounted movable in rotation on the housing 2, at least one latching dog 81 mounted movable in translation on the housing 2, biasing means 82 and electromagnetic means operatively linked to the biasing means 82. The fail-safe shutdown system controls the fail-safe closure of the valve 1.

Here, the biasing means 82 is a torsion spring linked to the ring 83, and twelve latching dogs 81 and only one electromagnet 84 are used. The electromagnet 84 has a first portion 84a mounted integral with the housing 2 and a second portion 84b mounted integral to the ring 83. The latching dogs 81 are mounted to the housing 2 by means of brackets 85.

In "normal production mode", meaning when power is supplied, the springs 51 of the biasing assembly 5 are compressed and the ring 83 is in the latched position. Indeed, as shown in FIG. 7a, when the springs 51 are energized the electromagnet 84 is also energized and the second latching unit 8 is locked in the housing 2.

Hence, when the actuator A functions "normally", the electric supply controls the electromagnet 84 and keeps it energized all the time. However, in the event of an emergency shutdown or a power failure for example, the electromagnet 84 moves off to the unlatched position shown in FIG. 7b. Thus, the second latching unit 8 is no longer locked in the housing 2.

The electromagnet 84 is thus operatively linked to the biasing means 82 so as to prevent rotation of the ring 83 under the action of the biasing means 82 when energized and allow this rotation on de-energization. The electromagnet 84 as mounted only sustains the torque due to the rotation of the fail-safe shutdown system, generated by the spring 82.

Figure 8:
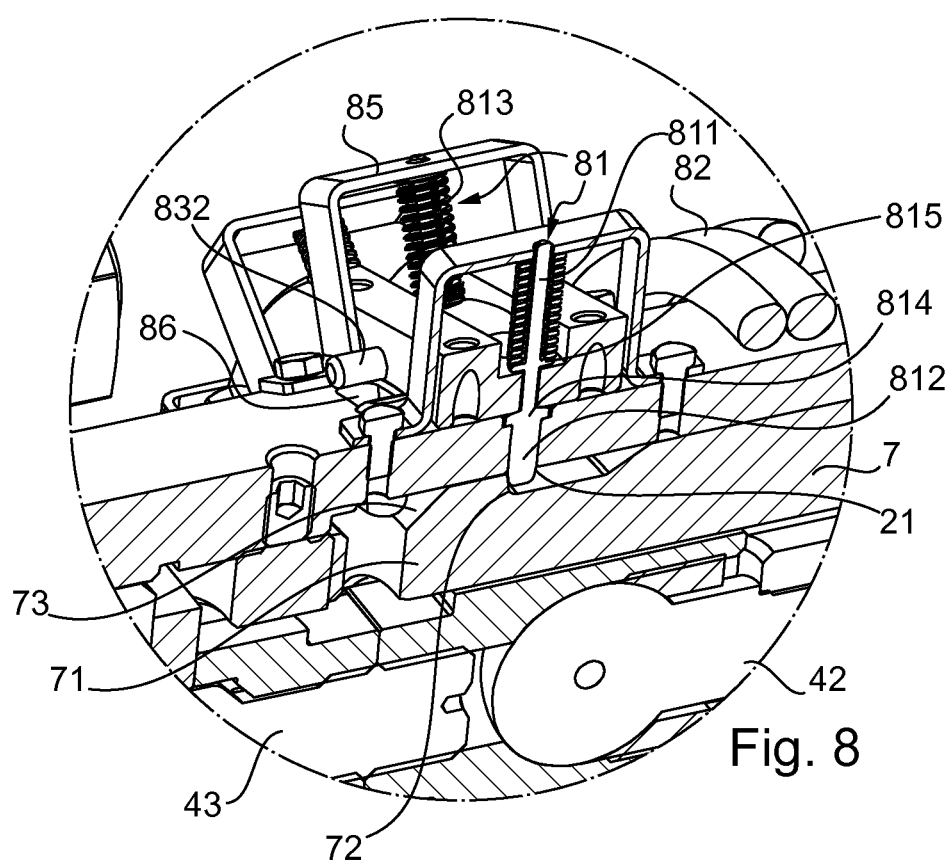
FIG. 8 is a perspective view of the latching dog in a latched position.

In fact, when the springs 51 are energized, several latching dogs 81 shown in FIG. 8 hold the first latching unit 7 mechanically locked in the housing 2. The housing 2 is provided for this purpose with at least one hole 21 for the radial passage of a latching dog 81 and the first latching unit 7 comprises a stop 71 for latching engagement with a latching dog 81. Hence, as soon as the electromagnet 84 is no longer energized, the spring 82 rotates the ring 83 by few degrees and the latching dogs 81 unlock the first latching unit 7 from the housing 2.

Figure 9A:
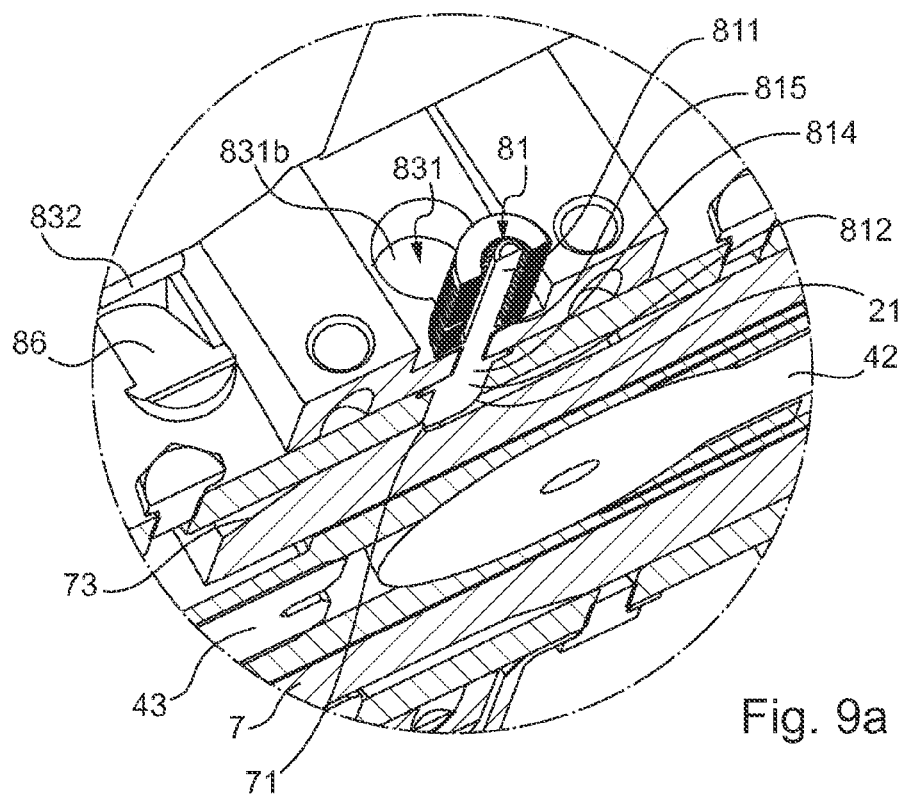
FIG. 9a is view of a latching dog inserted in a keyhole passage and positioned in a latched position.
Figure 9B:
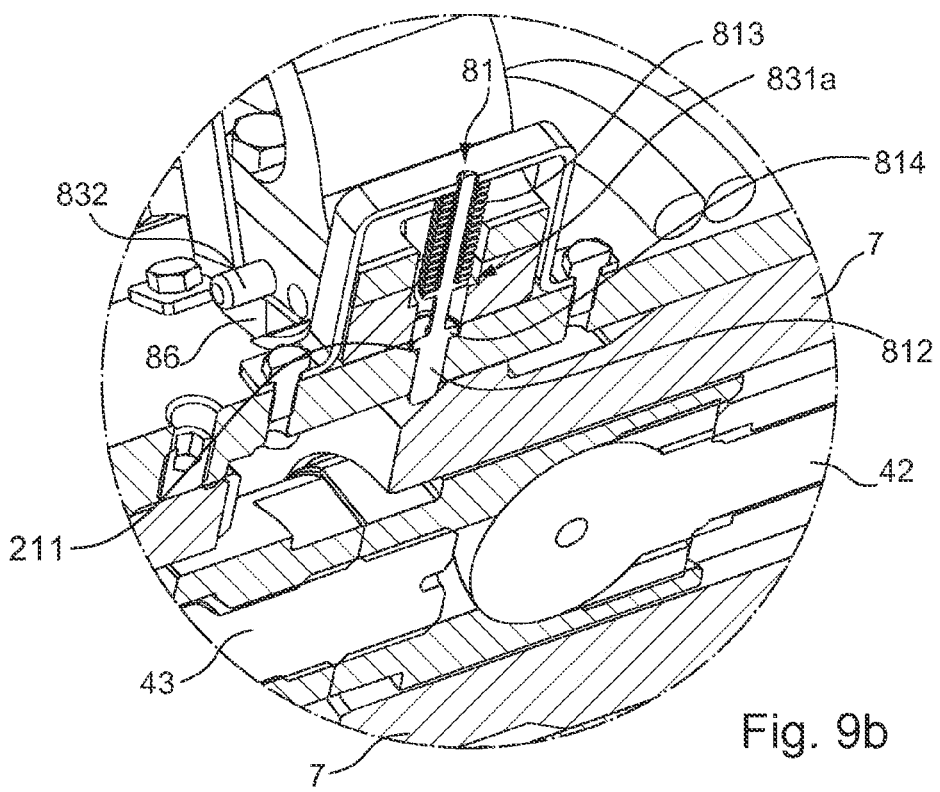
FIG. 9b is view of a latching dog inserted in a keyhole passage and positioned in an unlatched position.

More precisely, as shown in FIGS. 9a and 9b, the ring 83 comprises at least one passage 831 having a keyhole shape and communicating with the hole 21 in the housing 2 wherein the latching dogs 81 are inserted when the fail-safe shutdown system is in the latched position.

The latching dogs 81 comprise a rod portion 811 extended by a diametrically wider head portion 812 for latching engagement with the stop 71 of the first latching unit 7 as well as a biasing element 813. The latter is a spring, in practice for biasing the latching dog 81 toward its latched position. The holes 831 comprise each a slot portion 831a and a cylindrical portion 831b. The slot portion 831a of the keyhole passage 831 allows the passage of the rod portion 811 of the latching dog 81 but forms a stop for its head portion 812 to block the head portion 812 of the latching dog 81 in latching engagement with the first latching unit 7 shown in FIG. 9a. When no more power is supplied, the ring 83 rotates, driven by the biasing spring 82 to the fail-safe mode, and hence the cylindrical portion 831b of the keyhole passage 831 communicates with the hole 21 and allows the passage of the head portion 812 of the latching dog 81. The biasing spring 82 urge indeed the ring 83 in rotation toward a position in which the hole 21 in the housing 2 is aligned with the cylindrical portion 831b of the keyhole passage 831 (as shown in FIG. 9b), whereby the first latching unit 7 can be moved from the failsafe energized position to the failsafe position under the effect of the biasing assembly 5.

The shape of the latching dogs 81 and the passages 831 enable easy latching and unlatching operations.

Figure 10A:
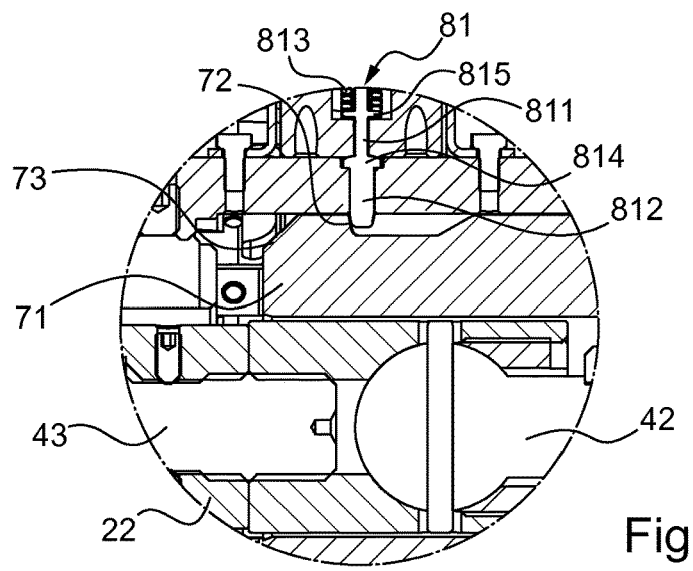
FIGS. 10a, 10b and 10c are views of the steps of the fail-safe closure.
Figure 10B:
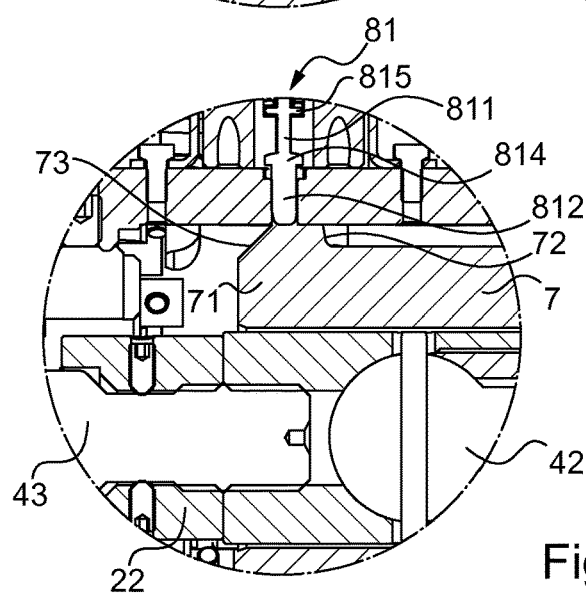
Figure 10C:
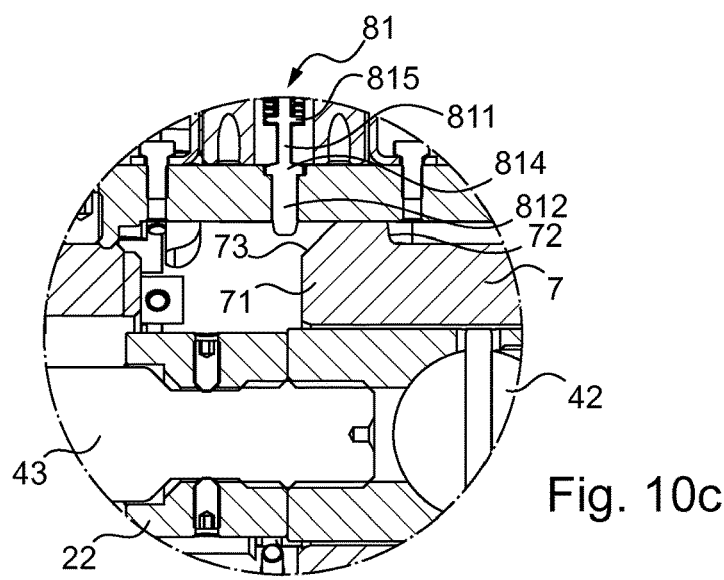

Illustrated in particular in FIGS. 10a, 10b and 10c are the fail-safe closure steps.

FIG. 10a shows the position of the latching dogs 81 when the electromagnet 84 is energized and thus the fail-safe shutdown system is latched in energized position. The latching dogs 81 also comprise an annular projection 814 which abuts on a widening 211 of the hole 21 in the housing 2 (see FIG. 9b). Another annular projection 815 arranged on the rod portion 811 permits the mounting of each spring 813 on the latching dog 81 between it and the bracket 85 and it abuts on the slot portion 831a in the latched position of the latch dog 81.

At this step, the springs 51 will pull on the rest of the actuator A but the latching dogs 81 locked in the housing 2 prevent the first latching unit 7 from moving under the effect of the springs 51. Hence, spring energy is stored (position called "energized" position) when the electric motor 31 functions normally.

As shown in FIG. 10b, as soon as the electromagnet 84 comes off its latched position meaning that it is no longer energized, the ring 83 rotates under the action of the biasing spring 82, the latching dogs 81 are able to be lifted upwards under the effect of the translation of the first latching unit 7 and against action of the spring 813. The motion of the first latching unit 7 is here possible thanks to the springs 51.

As shown more particularly in the FIG. 10a, the stop 71 on the first latching unit 7 forms a first ramp 72 adapted to lift the latch dog against the effect of the biasing spring 813 when the first latching unit 7 is moved toward the fail-safe position under the effect of the biasing assembly 5.

Indeed, when no more power is supplied, the springs 51 are released, pulling thus on the first latching unit 7. As the first latching unit 7 has the drive nut 33 captive in it, the drive nut 33 is mounted to the upper stem 41 and the drive connection 32 is mounted to the first latching unit 7, the translation of the first latching unit 7 toward the right generates the motion of the drive connection 32 and the upper stem 41 in the same direction. Hence the stems continue moving until the lower stem 43 reaches the closed position meaning that the stem back seat 431 reacts against the bonnet back seat 24. The gate valve is then closed and the fail-safe position is reached.

Then, as represented in FIG. 10c, the latching dogs 81 come back to the position ready to latch, as they are no longer in contact with the first latching unit 7. The projection 814 of the latching dogs 81 abuts against the widening 211 of the hole 21. The widening 211 has a dimension adapted to block the projection 814 in it so that the latching dogs 81 cannot be pushed down through the hole 31 any further.

The lower stem 43 continues moving in translation until the stem back seat 431 reaches the bonnet back-seat 24 and the springs 51 are totally released.

As long as the springs 51 are released, the electric motor 31 cannot rotate in such a way that the stems open the gate valve 1, thanks to the limit switch 55 and PLC. Indeed, the electric motor 31 is only authorized to rotate in the direction which generates a translation of the stems towards the fail-safe-position (here to the right). The stem back seat 431 of the lower stem 43 is hence blocked in the bonnet back seat 24. The fail-safe position is reached and the gate valve 1 is thus closed and secured. At this stage, the actuator A is ready to come back to the normal production mode as soon as power is restored.

The biasing assembly 5 energy is controlled during the fail-safe release by deceleration cylinders 53, visible on FIGS. 6a and 6b. These deceleration cylinders 53 enable an accurate adjustment of the closure time of the gate valve 1. Indeed, given the high values of torque at stake, the deceleration cylinders 53 are necessary to control the speed. Such cylinders 53 are similar in practice to dampers.

Moreover, a fail-safe limit switch sensor 55 (illustrated on FIG. 3) detects the activation of the fail-safe thanks to the monitoring of the position of the secondary transmission 322. The limit switch sensor 56 is connected to the programmable logic controller mentioned above to unable gate valve 1 operation if the fail-safe shutdown system is not energized.

As of now, the re-energizing process also called the "automatic latching step" will be disclosed based on FIG. 8.

At this stage, the gate valve 1 is still in the closed position meaning that the stem back seat 431 of the lower stem 43 abuts against the bonnet back seat 24. When power is restored, the electric motor 31 rotates in the opposition direction to generate a translation to the left. The drive nut 33 hence rotates in this direction. However, as the stem back seat 431 reacts against the bonnet back seat 24, the stems cannot translate to the left. As the first unit 7 have the drive nut 33 captive in it, the rotation of the drive nut 33 hence generates the motion of the first latching unit 7 to the left and the springs 51 are thus also compressed.

As visible on FIG. 8, the stop 71 of the first latching unit 7 comprises a second ramp 73 facing away from the first ramp 72 and adapted to lift the latching dog 81 when the first latching unit 7 moves in a direction opposite to the movement toward the failsafe position. Once the latching dogs 81 are lifted upwards, the first latching unit 7 continues moving until it reaches an end stop 74 (shown in FIG. 5).

The latching dogs 81 are locked again in the housing 2 and the gate valve 1 can be finally actuated in the "normal production mode". Hence, if the gate valve 1 is to be opened, the drive nut 33 rotation in said opposite direction generates the translation of the stems and the stem back seat 431 of the lower stem 43 can move beyond the bonnet back seat 24. The gate valve 1 moves thus to the open position.

To re-energize the biasing spring 82, the second latching unit 8 comprises a movement transformation element 86, visible on FIG. 8, mounted movable in translation in a hole made in the housing 2. The hole of the movement transformation element 86 is positioned after the holes 21 in which the latching dogs 81 are inserted, in the direction of the automatic latching. The movement transformation element 86 has an end adapted to cooperate with the second ramp 73 to lift the element when the first latching unit 7 moves in the direction opposite to the movement toward the failsafe position. The transformation element 86 has as well an opposite end having a ramp adapted to cooperate with a lateral projection 832 of the ring 83 when lifted by the first latching unit 7, so as to cause the ring 83 to rotate in a direction opposite to that imparted by the biasing spring 82, against the force exerted by the latter. This positions the slot portion 831a of the ring 83 again over the hole 21 in the housing 2 and allows re-energization of the electromagnetic means.

Represented on FIGS. 11a to 16b is a second embodiment of the second latching unit 8', as an alternative to the latching unit 8 described above.

Within this document, the words "right" and "left" are used to simplify the comprehension and are relative to the figures. These words should not be interpreted in a restrictive manner.

Moreover, the words longitudinal and transversal are used in this document. The longitudinal axis should be understood as being parallel to the translation movement axis of the first latching unit. The transversal axis or plan shall mean perpendicular to the longitudinal axis or plan.

The second latching unit 8' comprises a ring 83'. In the illustrated embodiment, the ring 83' is transversally divided into two identical parts, the right part 83a' and the left part 83b'. The virtual plan dividing the ring into two parts is here referred to as the transversal median plan P.

Each of the right part 83a' and left part 83b' comprises an outer face 834' and an internal face 835' (see, e.g., FIGS. 13a to 14b). The ring 83' is mounted movable in translation on the housing 2, more specifically on an external surface 25 of the housing 2. The surface in contact with the ring 83 is referred to as external surface 25 of the housing 2 and the surface facing the first latching unit 7 is referred to as internal surface 26 of the housing 2.

The right part 83a' and the left part 83b' can be held together or can be separated depending if the actuator A is energized or not.

The right part 83a' and the left part 83b' comprise respectively at least one right cavity 831a' and at least one left cavity 831b'. In the described embodiment, the ring 83' has twelve right cavities 831a' and twelve left cavities 831b'. The right cavities 831a' and the left cavities 831b' present here the same semi-cylindrical form and dimensions.

The second latching unit 8' comprises at least one latching dog 81 mounted movable in translation on the housing 2. In the described embodiment, the second latching unit 8' comprises twelve latching dogs 81. The latching dogs 81 are here similar to those described in the first embodiment. The latching dogs are also similarly disposed and thus no further description about the latching dogs will be developed here.

Figure 11A:
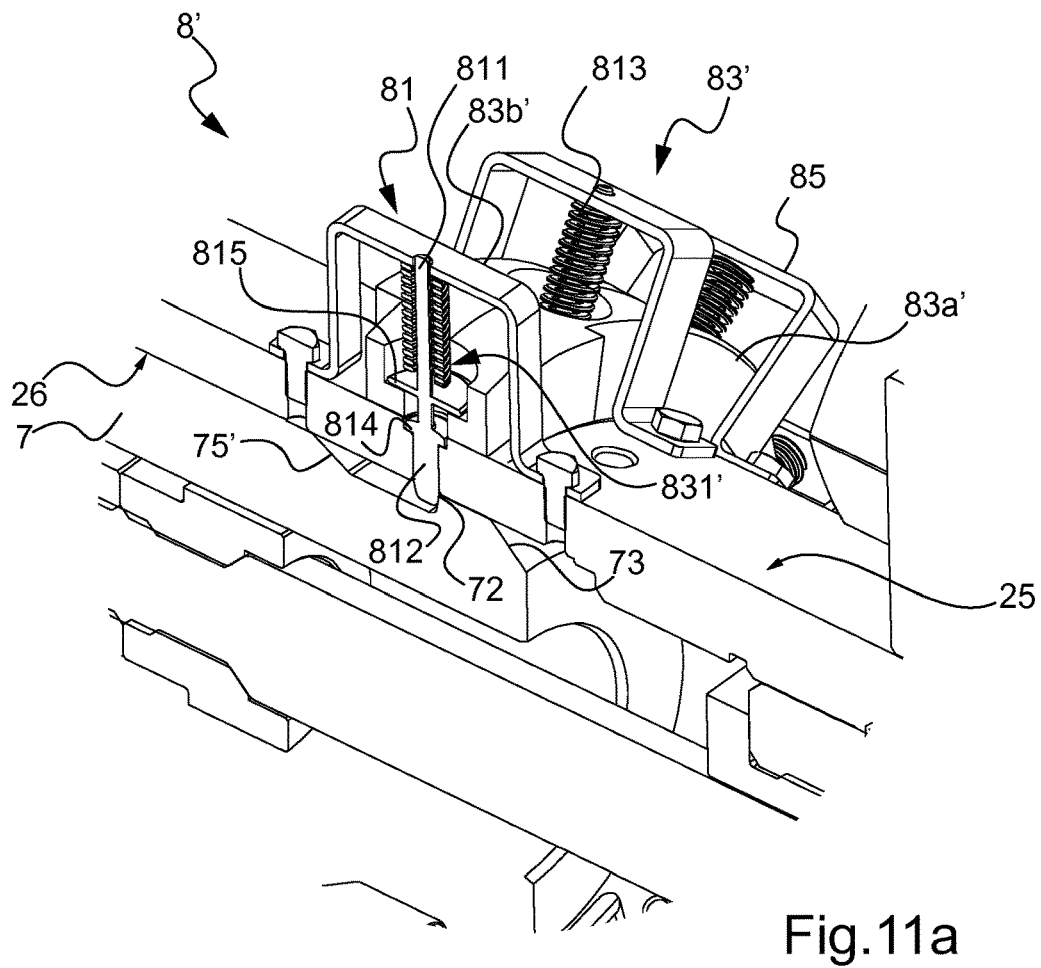
FIG. 11a is a perspective view of the ring in a joined position according to second embodiment.
Figure 11B:
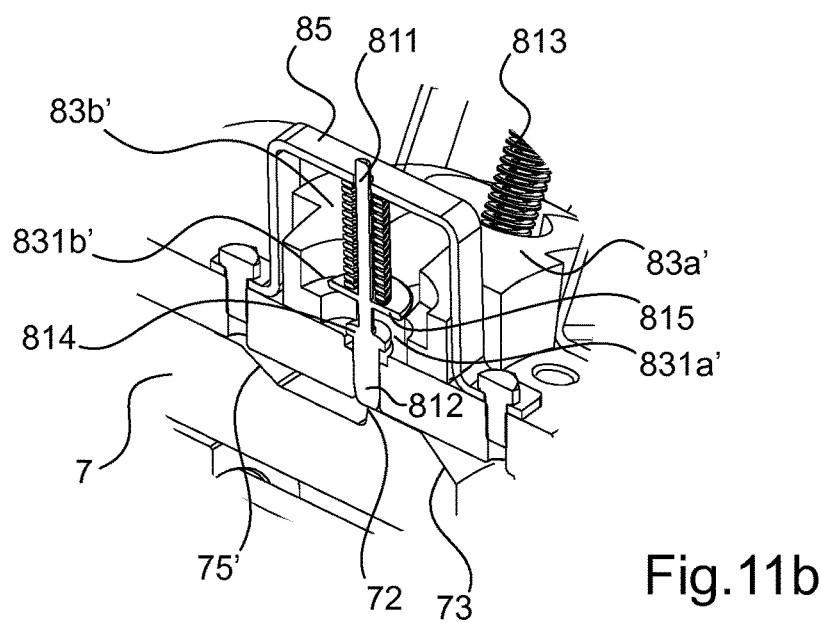
FIG. 11b is a perspective view of the ring in separated position according to second embodiment.

FIGS. 11a and 11b show the second latching unit 8' respectively in the latched and unlatched positions according to the second embodiment.

FIG. 11a illustrates the ring 83' when the actuator A is in the "normal production mode", meaning that the actuator is energized and the springs 51 of the biasing assembly 5 are compressed. The right part 83a' and the left part 83b' are bonded. In other words, the internal faces 835' of the right part 83a' and the left part 83b' abut one against the other. Each right cavity 831a' and each left cavity 831b' are formed opposite one to the other such that when the right part 83a' and the left part 83b' are held together, each right cavity 831a' and each left cavity 831b' form a passage 831' communicating with a hole 21' in the housing 2. The at least one passage 831' presents here a cylindrical form. The ring 83' is symmetrical to the transversal median plan P. The latching dogs 81 are inserted in the passages 831' and the holes 21'. Similarly, to the first embodiment, the annular projection 814 of each latching dog 81 abuts on the widening 211 of the corresponding hole 21' in the housing 2. The annular projection 815 of each latching dog 81 abuts on the passage 831' in the latched position of the latching dog 81. The at least one latching dog 81 is thus in latching engagement with the first latching unit, i.e. the at least one latching dog abuts against the first ramp 72.

FIG. 11b illustrates the ring 83' when the actuator A is not energized. The right part 83a' and the left part 83b' are separated. The right cavities 831a' and the left cavities 831b' no longer form the passages 831'. The biasing element 813 of each latching dog 81 is released due to the loss of energy making the latching dogs 81 move upwards from the holes 21'. The at least one latching dog 81 is thus no more in latching engagement with the first latching unit, i.e. the at least one latching dog does not abut against the first ramp 72. The movement up and down of the latching dogs 81' thanks to the biasing elements 813 is the same as in the first embodiment and will not be described again here.

Figure 12A:
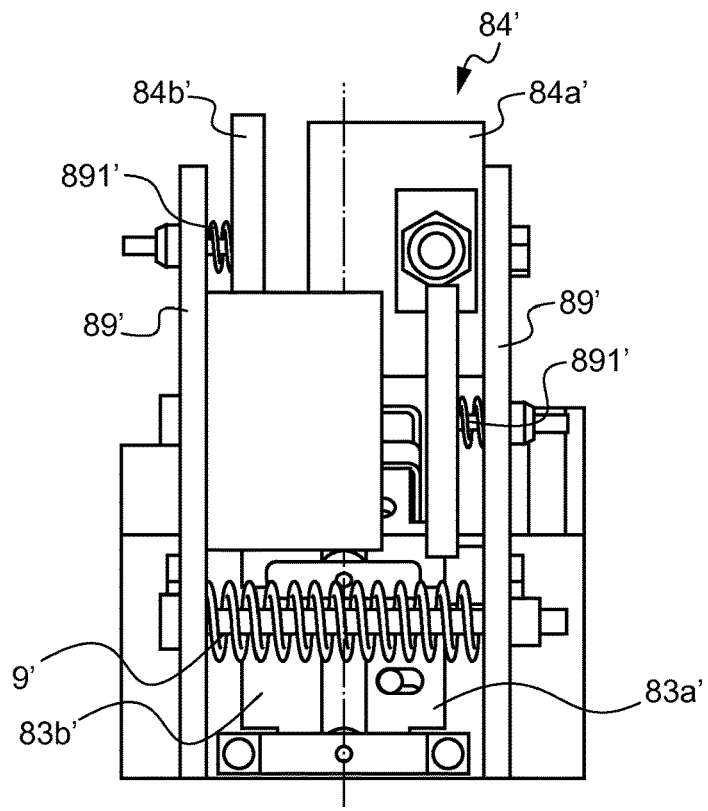
FIG. 12a is a perspective view of the second latching unit in an unlatched position according to second embodiment.
Figure 12B:
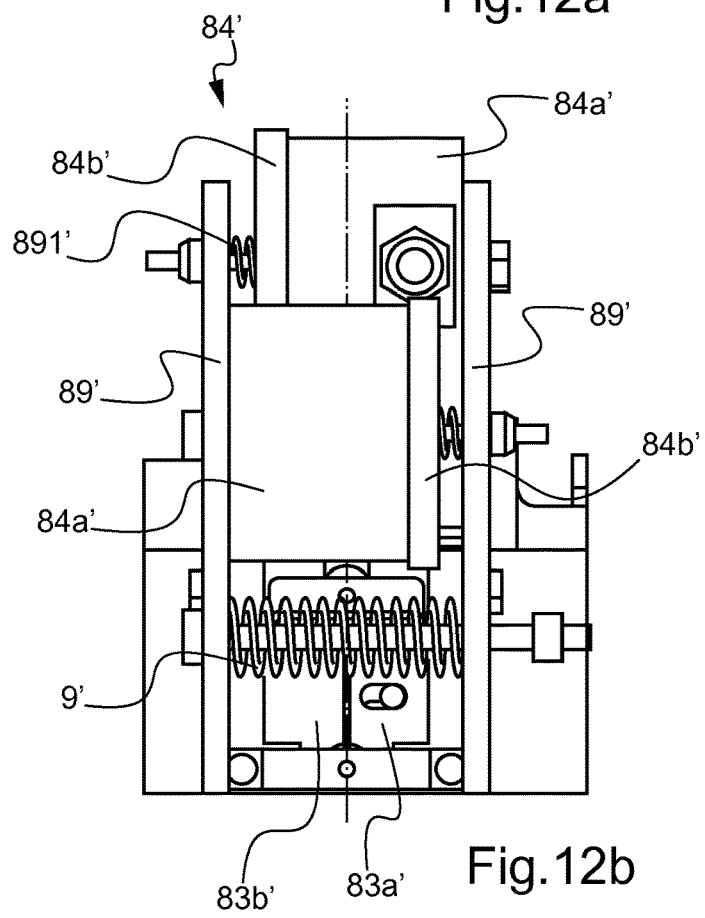
FIG. 12b is a perspective view of the second latching unit in a latched position according to second embodiment.
Figures 15A, 15B:
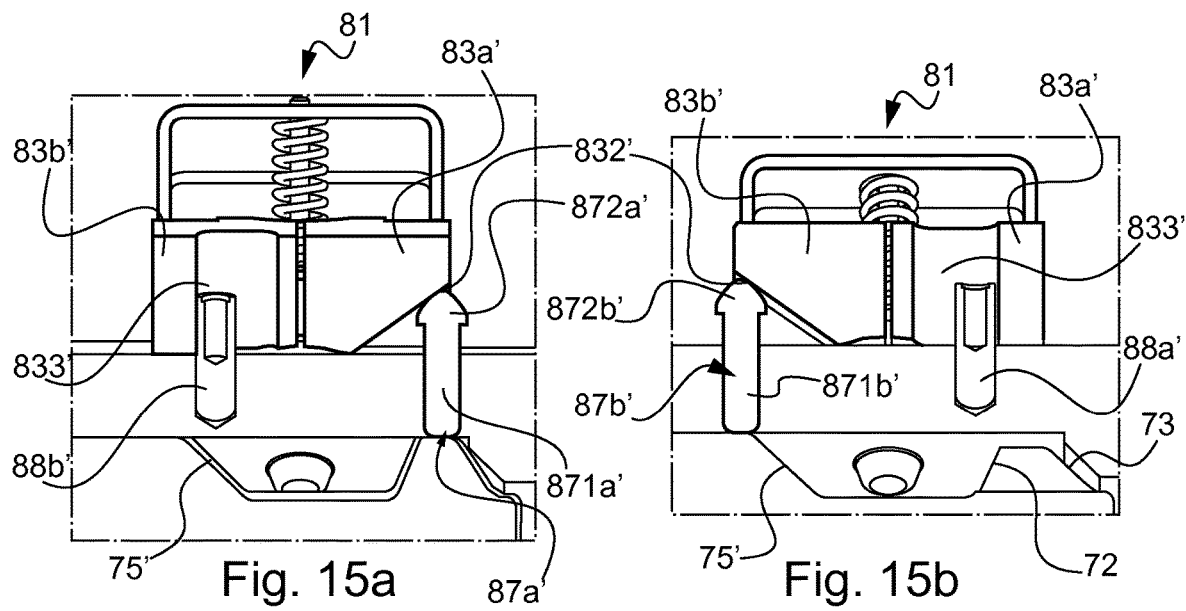

In this second embodiment and as illustrated on FIGS. 12a, 12b, the second latching unit 8' comprises furthermore here on both sides of the ring 83' two mobile support disks 89' mounted around the housing 2. The two mobile support disks 89' are here disposed parallel to each other.

The second latching unit 8' also comprises at least one electromagnet 84' illustrated on FIGS. 12a, 12b. The second latching unit comprises here six electromagnets 84'.

The at least one electromagnet 84' comprises here a first portion 84a' and a second portion 84b'. The first portion 84a' being disposed on one of the support disks 89'. The second portion 84b' being mounted here to the other support disk 89' by means of a spring 891'.

In this second embodiment and as illustrated on FIGS. 12a, 12b, the second latching unit 8' comprises at least one compression spring 9' or biasing means mounted perpendicularly to the mobile support disks 89'. When the actuator is energized, the at least one compression spring 9' is compressed as shown in FIG. 12b. On de-energization, as illustrated on FIG. 12a, the at least one compression spring 9' enables the right part and the left part to be separated. The at least one compression spring 9' also regulates the split movement of the left part 83a' and the right part 83b' on de-energization. The second latching unit 8' comprises here twelve compression springs 9'.

Illustrated on the FIGS. 13a to 16b is the re-energization process during which the right part and the left part are initially separated (FIGS. 13a and 13b) and end up joined or bonded (FIGS. 15a, 15b, 16a, 16b). FIGS. 13a, 14a, 15a, 16a are cut-off views made along a first cut plane. FIGS. 13b, 14b, 15b, 16b correspond to cut-off views made along a second cut plane, here different from the first cut plane of FIGS. 13a, 14a and 15a. The first and second cut plane form here a non-zero angle, here equal to 30°.

In this document, the position in which the right part 83a' and left part 83b' are separated is referred to as the "separated position" or second position. And the position in which the right part 83a' and left part 83b' are joined is referred to as "joined position" or first position.

The second latching unit 8' comprises here at least two energizing dogs 87', also called actuating dogs or movement transformation elements, including at least one right energizing dog 87a' and at least one left energizing dog 87b'. In the described second embodiment, the fail-safe shutdown system 8' comprises eight energizing dogs, i.e. four right energizing dogs 87a' and four left energizing dogs 87b'.

The energizing dogs 87' are disposed perpendicularly to the translation movement axis of the first latching unit, i.e. transversally. Each energizing dog 87a', 87b' has an elongated portion 871a', 871b' extended by a larger top portion 872a', 872b'. The elongated portion 871a', 871b' has a cylindrical form and the top portion 872a', 872b' is beveled. Each elongated portion 871a', 871b' is linearly movable in a through bore or hole 212 formed in the housing 2. Each top portion 872a', 872b' protrudes from the corresponding through bore 212 at the external surface 25 of the housing 2.

FIGS. 13a and 13b show the ring 83' at the separated position. The first latching unit 7 is in the failsafe position. The movement of the first latching unit 7 with respect to the other elements of the actuator, in particular the stems and transmissions for positioning into the failsafe position is the same as in the first embodiment and will not be described again. Moreover, the first latching unit 7 presents the same form as in the first embodiment. In particular, the first latching unit 7 comprises a stop 71 having a first ramp 72 and second ramp 73. The first latching unit 7 also comprises a third ramp 75', not described in the first embodiment, formed such that the first ramp 72 and the third ramp 75' form a trapezoidal sectional cavity in the housing 2.

One right energizing dog 87a' is visible on FIG. 13a and the corresponding left energizing dog 87b' is visible on FIG.

13b. The right energizing dogs 87a' and the left energizing dog 87b' are here laid out in zig zag fashion.

As shown in FIGS. 13a, 13b, when the actuator is in the failsafe position, for example when a loss of energy occurs, the top portions 872a', 872b' of the energizing dogs 87' abut on the housing 2. A part of the elongated portions 871a', 871b' protrudes from the internal surface 26 of the housing 2. The top portions 872a', 872b' of the energizing dogs 87' abut on the external surface 25 of the housing 2. The at least one latching dog 81 moves upwards under the effect of the biasing element 813 which is released due to the loss of energy.

The top portions 872a', 872b' are respectively in contact with the right part 83a' and the left part 83b' of the ring 83'. In particular, the top portions 872a', 872b' are in contact with notches 832' formed at each of the right part 83a' and left part 83b'. The notches 832' form here an inclined plane creating thus a camming effect with the energizing dogs 87'. The ring 83' comprises here eight notches 832', i.e. four at each part.

On re-energization the first latching unit 7 moves in a direction opposite to the movement toward the failsafe position, as illustrated on FIGS. 14a and 14b. The second ramp 73 of the stop 71 of the first latching unit 7 lifts thus the at least one latching dog 81. Then the first latching unit 7 continues its translation movement opposite to the movement toward the failsafe position until the second ramp 73 lifts the at least one right energizing dog 87a' and the third ramp 75' lifts the at least one left energizing dog 87b'. The at least one latching dog 81 moves downwards in the hole 21' under the effect of the biasing element 813 which is compressed.

The here simultaneous upward movement of the right energizing dog 87a' and the left energizing dog 87b' makes each of the top portions 872a', 872b' push on the right part 83a' and the left part 83b' of the ring 83'. The right part 83a' and the left part 83b' are therefore brought closer. On the same time, the first portion 84a' and the second portion 84b' of the at least one electromagnet 84' are brought closer one toward the other by means of the spring 891'. The two support disks 89' are thus brought closer, making the at least one compression spring 9' compress.

As the first latching unit 7 moves in the direction opposite to the movement toward the failsafe position and the right part 83a' and the left part 83b' translate one toward the other, the top portions 872a', 872b' are in contact with the right part 83a' and the left part 83b' at different points of the notches. The contact points of the top portions 872a', 872b' with the right part and the left part progress along the notches 832' until the top portions 872a', 872b' come in contact at the outer end of the notches 832' as visible on FIGS. 15a and 15b.

At the final stages (illustrated on FIGS. 15a, 15b, 16a, 16b) of the re-energization process, the right part 83a' and the left part 83b' are bonded. First, the lower end of the elongated portion 871a', 871b' of each energizing dog extends in the same plane as the internal surface as shown on FIGS. 15a, 15b. A part of the elongated portions 871a', 871b' protrude from each through bore 212 at the external surface 25 of the housing 2. The at least one latching dog 81 is maintained in the passage 831' formed by the right cavity 831a' and the left cavity 831b' and the head portion 812 protrudes from the hole 21' of the housing 2. The second portion 84b' of the electromagnet 84' rests against the first portion 84b', preventing the right part 83a' and the left part 83b' to be separated.

Figures 16A, 16B:
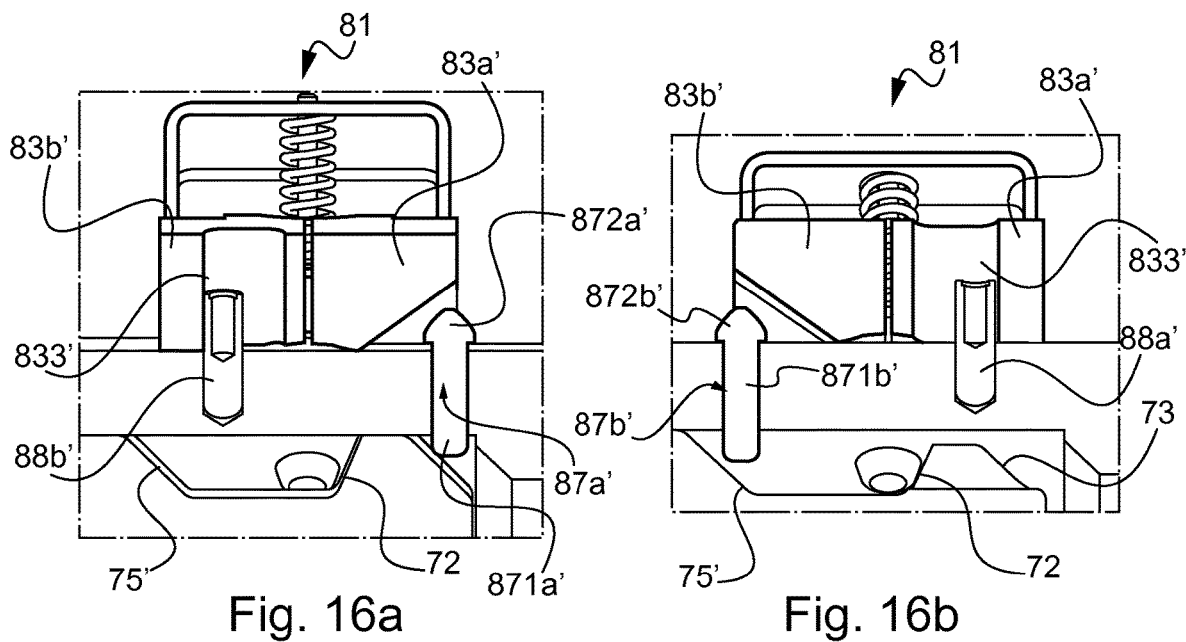

Then, as illustrated on FIGS. 16a, 16b, the electric motor 31 rotates in such a way that the first latching unit 7 is moved toward the left, making the at least one latching dog 81 rest against the first ramp 72 of the first latching unit 7. The at least one latching unit 81 is thus in latching engagement. The at least one right energizing dog 87a' and the at least one left energizing dog 87b' move thus down in their associated through holes 212. A part of the elongated portions 871a', 871b' protrudes from the internal surface 26 of the housing 2 and the top portions 872a', 872b' of the energizing dogs 87' abut on the external surface 25 of the housing 2.

The failsafe closure steps are not illustrated for this embodiment. The steps are the same as for the re-energization process but occur in reverse order. As long as the actuator is energized, the right part 83a' and the left part 83b' are bonded and all the elements of the second latching unit are in the position illustrated at FIGS. 16a, 16b and described previously.

When a loss of energy occurs, the springs 51 urge the stems, and in particular the first latching unit 7, toward the failsafe position. The second portion 84b' of the at least one electromagnet 84' is separated from the first portion 84a'. The at least one compression spring 9', initially pre-compressed, is released when the actuator is no more energized and the two support disks 89' are thus moved away from each other. As the first latching unit 7 progresses, the first ramp 72 does not push on the right energizing dog 87a' any longer. The at least one right energizing dog 87a' moves downs in its through bore 212 and protrudes from the through bore 212 at the internal surface 26 of the housing 2. Then the first latching unit 7 pushes on the at least one latching dog at the second ramp 73 while the right part 83a' and left part 83b' are separated on the same time. The at least one latching dog is lifted upwards under the effect of the biasing element 813 which is released due to the loss of energy. Finally, the first latching unit 7 continues its translation movement until the at least one left energizing dog 87b' is no longer in contact with the first latching unit 7. The at least one left energizing dog 87b' also moves downwards in its through bore 212 and protrudes from the through bore 212 at the internal surface 26 of the housing 2. The first latching unit occupies thus the failsafe position.

The second latching unit 8' also comprises here at least two pins 88', at least one right pin 88a' and at least one left pin 88b', disposed respectively in at least two recesses 833' formed respectively in the right and left parts 83a', 83b'. In this second embodiment, the second latching unit 8' comprises eight pins 88', four at each part. The at least two pins 88a', 88b' are laid out in zig zag fashion perpendicularly to the translation movement axis of the first latching unit 7. The at least one right pin 88a' disposed in the right part 83a' is longitudinally aligned with the at least one left energizing dog 87b'. The at least one pin 88b' disposed in the 10 left part 83b' is longitudinally aligned with the at least one right energizing dog 87a'.

When the actuator is not energized and the ring 83' is in the separated position as in FIGS. 13a, 13b, the at least two pins 88a', 88b', abut against the recesses 833' on the side close the internal faces of the right and left parts 83a', 83b'. During the re-energization process, the contact surface of the recess 833' with the at least two pins 88' progress as the right part and the left part move as shown in FIGS. 14a, 14b. When the ring reaches its joined position, the at least two pins 88a', 88b' abut against the recesses on the side close the outer faces of the ring 83'. The at least two pins 88a', 88b' limit the displacement of the left and right parts 83a', 83b' of the ring 83'.

The second latching unit 8' according to the second embodiment presents the advantage of requiring only a little amount of force for it to be put into the failsafe position. Indeed, due to the structure of the second latching unit 8', the latching dogs push on the internal faces of the right part and left part of the ring and tend to separate the two parts 83a', 83b'.

The present electric actuator A with a fail-safe mechanism presents many advantages, one of which is being energy efficient and thus cost efficient.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

For example, the primary transmission 321 and secondary transmission 322 can be replaced with at least one chain and/or at least one belt.

A compression spring can be used as biasing means 82 to replace the torsion spring.

The springs 51 shown as helicoidal springs can be replaced by Belleville springs or elastomeric springs.

More electromagnets 84 can be set on the ring 83.

As an alternate solution to the electromagnets 84, a solenoid can be used.

The invention claimed is:

1. A failsafe electric valve actuator for a valve, comprising:
    a housing having a first end which is mounted to a body of the valve;
    a stem mounted for translation in the housing for moving a valve member of the valve between valve open and valve closed positions;
    a drive assembly for moving the stem in translation, the drive assembly comprising an electric motor and a drive connection from the motor to the stem, the drive connection being configured to convert rotary motion of the motor into translation motion of the stem;
    a biasing assembly adapted to act on the stem to urge the stem toward a failsafe position; and
    a fail-safe shutdown system to selectively release the stem from a position in which it was placed by the drive assembly to allow the biasing assembly to urge the stem toward the failsafe position, the shutdown assembly comprising a first latching unit mounted for translation in the housing and a second latching unit mounted on the housing for latching engagement with the first latching unit, wherein the stem can be moved free from the action of the biasing assembly in a latched state of the first and second latching units;
    wherein the drive assembly and the stem are mounted for translation with the first latching unit on a part of the first latching unit which projects from a second end of the housing opposite said first end and is mounted for translation with the biasing assembly;
    wherein the second latching unit comprises at least one latching dog mounted for translation on the housing, the housing being provided with a first hole for passage of the latching dog, and the first latching unit comprising a stop for latching engagement with the latching dog; and
    wherein the second latching unit comprises a biasing element for urging the latching dog toward the stop of the first latching element, and wherein the stop on the first latching unit forms a first ramp adapted to lift the latching dog against the effect of the biasing element when the first latching unit is moved toward the failsafe position under the effect of the biasing assembly.

2. The actuator according to claim 1, wherein the latching dog comprises a rod portion and a diametrically wider head portion adapted for latching engagement with the stop of the first latching unit, and wherein the second latching unit comprises a ring mounted for rotation on the housing and having at least one keyhole passage communicating with the first hole in the housing, the keyhole passage comprising a slot portion which allows passage of the rod portion of the latching dog but forms a stop for the head portion which maintains the head portion in latching engagement with the first latching unit, the keyhole passage further comprising a cylindrical portion which allows passage of the head portion of the latching dog, wherein the fail-safe shutdown system furthermore comprises biasing means for urging the ring in rotation toward a position in which the first hole in the housing is aligned with the cylindrical portion of the keyhole passage so as to enable the first latching unit to be moved toward the failsafe position under the effect of the biasing assembly.

3. The actuator according to claim 2, wherein the biasing means comprise a torsion spring.

4. The actuator according to claim 2, wherein the fail-safe shutdown system comprises electromagnetic means operatively linked to the biasing means so as to prevent rotation of the ring under the action of the biasing means when the electromagnetic means is energized and allow rotation of the ring under the action of the biasing means when the electromagnetic means is de-energized.

5. The actuator according to claim 4, wherein the electromagnetic means comprise an electromagnet having a first portion mounted to the housing and a second portion mounted to the biasing means.

6. The actuator according to claim 2, wherein the stop on the first latching unit comprises a second ramp facing away from the first ramp and adapted to lift the latching dog when the first latching unit moves in a direction opposite to the movement toward the failsafe position, and wherein the second latching unit comprises a movement transformation element mounted for translation in a second hole in the housing, the movement transformation element having an end adapted to cooperate with the second ramp to lift the movement transformation element when the first latching unit moves in the direction opposite to the movement toward the failsafe position, and an opposite end having a ramp adapted to cooperate with a lateral projection of the ring when the movement transformation element is lifted by the first latching unit so as to cause the ring to rotate in a direction opposite to that imparted by the biasing means, and against the force exerted by the biasing means, to position the slot portion of the ring over the first hole in the housing and allow re-energization of the electromagnetic means.

7. The actuator according to claim 1, wherein the latching dog comprises a rod portion and a diametrically wider head portion adapted for latching engagement with the stop of the first latching unit, and wherein the second latching unit comprises a ring mounted on the housing and having a right part and a left part having respectively at least one right cavity and at least one left cavity, the at least one right cavity and at least one left cavity together forming at least one passage for the latching dog in a first position of the ring in which the right part and the left part abut against each other, the at least one passage communicating with the first hole in the housing and allowing the passage of the rod portion of the latching dog but forming a stop for the head portion which maintains the head portion in latching engagement with the first latching unit, the fail-safe shutdown system furthermore comprising biasing means for causing the right part and left part of the ring to move away from each other toward a second position in which the stop is able to lift the latching dog so as to enable the first latching unit to be moved toward the failsafe position under the effect of the biasing assembly.

8. The actuator according to claim 7, wherein the fail-safe shutdown system comprises electromagnetic means operatively linked to the biasing means so as to prevent separation of the right part and the left part of the ring under the action of the biasing means when the electromagnetic means is energized and allow separation of the right part and the left part under the action of the biasing means when the electromagnetic means is de-energized.

9. The actuator according to claim 8, wherein the second latching unit comprises two mobile support disks which are each mounted to a corresponding one of the right part and the left part of the ring around the housing, and the electromagnet means has a first portion and a second portion which are each arranged on a corresponding one of the mobile support disks, the first portion being attracted to the second portion when the actuator is energized, thereby making the latching dog rest against the first ramp of the first latching unit and preventing the right part and the left part from being separated.

10. The actuator according to claim 9, wherein the biasing means comprises at least one compression spring mounted perpendicularly to the mobile support disks so as to move the left part and the right part of the ring away from each other on de-energization of the electromagnetic means.

11. The actuator according to claim 7, wherein the stop on the first latching unit comprises a second ramp facing away from the first ramp and adapted to lift the latching dog when the first latching unit moves in a direction opposite to the movement toward the failsafe position, and wherein the second latching unit comprises at least one movement transformation element mounted for translation in a second hole in the housing, the movement transformation element having a lower end adapted to cooperate with a ramp of the first latching unit to lift the movement transformation element when the first latching unit moves in the direction opposite to the movement toward the failsafe position, and an opposite end adapted to cooperate with a notch of the ring when the movement transformation element is lifted by the first latching unit so as to cause the right part and the left part of the ring to move towards the first position and allow re-energization of the electromagnetic means.

12. The actuator according to claim 11, wherein the second latching unit comprises several movement transformation elements, including at least one right movement transformation element and at least one left movement transformation element, the movement transformation elements being arranged in zig zag fashion alternatively on the right part and the left part of the ring.

13. The actuator according to claim 12, wherein the first latching unit further comprises a third ramp facing the first ramp, and wherein on re-energization the second ramp of the first latching unit successively lifts the latching dog and the at least one right movement transformation element and the third ramp lifts the at least one left movement transformation element while the first latching unit moves in a direction opposite to the movement toward the failsafe position.

14. The actuator according to claim 7, wherein the second latching unit comprises at least one pin protruding from the housing and penetrating into a recess of one of the right and left parts of the ring to cooperate with said recess so as to limit the translation movement of the corresponding right or left part of the ring on the housing.

15. The actuator according to claim 1, wherein the drive assembly is adapted to move the first latching unit in a direction opposite to that moving it toward the failsafe position, and wherein the stem comprises a stop adapted to cooperate with a seat of the valve body so as to enable this opposite direction movement of the first latching unit.

16. The actuator according to claim 1, wherein the drive connection comprises, for moving the stem in translation, a drive nut in engagement with a thread in an outer surface of the stem.

17. The actuator according to claim 16, wherein the drive connection comprises means for transmitting torque from the electric motor to the drive nut.

18. The actuator according to claim 16, wherein the first latching unit has a tubular shape and the drive nut is translationally fixed with respect to the first latching unit.

19. A failsafe electric valve actuator for a valve, comprising:
a housing having a first end which is mounted to a body of the valve;
a stem mounted for translation in the housing for moving a valve member of the valve between valve open and valve closed positions;
a drive assembly for moving the stem in translation, the drive assembly comprising an electric motor and a drive connection from the motor to the stem, the drive connection being configured to convert rotary motion of the motor into translation motion of the stem;
a biasing assembly adapted to act on the stem to urge the stem toward a failsafe position; and
a fail-safe shutdown system to selectively release the stem from a position in which it was placed by the drive assembly to allow the biasing assembly to urge the stem toward the failsafe position, the shutdown assembly comprising a first latching unit mounted for translation in the housing and a second latching unit mounted on the housing for latching engagement with the first latching unit, wherein the stem can be moved free from the action of the biasing assembly in a latched state of the first and second latching units;
wherein the drive assembly and the stem are mounted for translation with the first latching unit on a part of the first latching unit which projects from a second end of the housing opposite said first end and is mounted for translation with the biasing assembly;
wherein the biasing assembly comprises at least one spring mounted between first and second parallel support plates, and wherein the first support plate is fixed to the housing and the second support plate is operatively linked to the first latching unit to urge the stem toward the failsafe position under the action of the at least one spring; and
wherein the first support plate and the drive means comprise complementary guiding means for guiding the translation movement of the drive assembly.

20. The actuator according to claim 19, wherein a damper is associated to each of spring of the biasing assembly.

21. The actuator according to claim 1, wherein the stem comprises two parts linked by a knuckle joint.

22. The actuator according to claim 1, wherein the actuator is a surface or a subsea electric actuator.

23. The actuator according to claim 1, further comprising a limit switch sensor arranged on the drive connection.

24. The actuator according to claim 1, further comprising a linear variable displacement transducer arranged on the housing and attached to the biasing assembly.

25. The actuator according to claim 1, further comprising a number of load sensors arranged next to the drive nut.

26. A failsafe electric valve actuator for a valve, comprising:
- a housing having a first end which is mounted to a body of the valve;
- a stem mounted for translation in the housing for moving a valve member of the valve between valve open and valve closed positions;
- a drive assembly for moving the stem in translation, the drive assembly comprising an electric motor and a drive connection from the motor to the stem, the drive connection being configured to convert rotary motion of the motor into translation motion of the stem;
- a biasing assembly adapted to act on the stem to urge the stem toward a failsafe position; and
- a fail-safe shutdown system to selectively release the stem from a position in which it was placed by the drive assembly to allow the biasing assembly to urge the stem toward the failsafe position, the shutdown assembly comprising a first latching unit mounted for translation in the housing and a second latching unit mounted on the housing for latching engagement with the first latching unit, wherein the stem can be moved free from the action of the biasing assembly in a latched state of the first and second latching units;
- wherein the drive assembly and the stem are mounted for translation with the first latching unit on a part of the first latching unit which projects from a second end of the housing opposite said first end and is mounted for translation with the biasing assembly;
- wherein the second latching unit comprises at least one latching dog mounted for translation on the housing, the housing being provided with a first hole for passage of the latching dog, and the first latching unit comprising a stop for latching engagement with the latching dog; and
- wherein the latching dog comprises a rod portion and a diametrically wider head portion adapted for latching engagement with the stop of the first latching unit, and wherein the second latching unit comprises a ring mounted for rotation on the housing and having at least one keyhole passage communicating with the first hole in the housing, the keyhole passage comprising a slot portion which allows passage of the rod portion of the latching dog but forms a stop for the head portion which maintains the head portion in latching engagement with the first latching unit, the keyhole passage further comprising a cylindrical portion which allows passage of the head portion of the latching dog, wherein the fail-safe shutdown system furthermore comprises biasing means for urging the ring in rotation toward a position in which the first hole in the housing is aligned with the cylindrical portion of the keyhole passage so as to enable the first latching unit to be moved toward the failsafe position under the effect of the biasing assembly.

27. The actuator according to claim 26, wherein the second latching unit comprises a biasing element for urging the latching dog toward the stop of the first latching element, and wherein the stop on the first latching unit forms a first ramp adapted to lift the latching dog against the effect of the biasing element when the first latching unit is moved toward the failsafe position under the effect of the biasing assembly.

28. The actuator according to claim 26, wherein the biasing means comprise a torsion spring.

29. The actuator according to claim 26, wherein the fail-safe shutdown system comprises electromagnetic means operatively linked to the biasing means so as to prevent rotation of the ring under the action of the biasing means when the electromagnetic means is energized and allow rotation of the ring under the action of the biasing means when the electromagnetic means is de-energized.

30. The actuator according to claim 29, wherein the electromagnetic means comprise an electromagnet having a first portion mounted to the housing and a second portion mounted to the biasing means.

31. The actuator according to claim 26, wherein the stop on the first latching unit comprises a second ramp facing away from the first ramp and adapted to lift the latching dog when the first latching unit moves in a direction opposite to the movement toward the failsafe position, and wherein the second latching unit comprises a movement transformation element mounted for translation in a second hole in the housing, the movement transformation element having an end adapted to cooperate with the second ramp to lift the movement transformation element when the first latching unit moves in the direction opposite to the movement toward the failsafe position, and an opposite end having a ramp adapted to cooperate with a lateral projection of the ring when the movement transformation element is lifted by the first latching unit so as to cause the ring to rotate in a direction opposite to that imparted by the biasing means, and against the force exerted by the biasing means, to position the slot portion of the ring over the first hole in the housing and allow re-energization of the electromagnetic means.

32. A failsafe electric valve actuator for a valve, comprising:
- a housing having a first end which is mounted to a body of the valve;
- a stem mounted for translation in the housing for moving a valve member of the valve between valve open and valve closed positions;
- a drive assembly for moving the stem in translation, the drive assembly comprising an electric motor and a drive connection from the motor to the stem, the drive connection being configured to convert rotary motion of the motor into translation motion of the stem;
- a biasing assembly adapted to act on the stem to urge the stem toward a failsafe position; and
- a fail-safe shutdown system to selectively release the stem from a position in which it was placed by the drive assembly to allow the biasing assembly to urge the stem toward the failsafe position, the shutdown assembly comprising a first latching unit mounted for translation in the housing and a second latching unit mounted on the housing for latching engagement with the first latching unit, wherein the stem can be moved free from the action of the biasing assembly in a latched state of the first and second latching units;
- wherein the drive assembly and the stem are mounted for translation with the first latching unit on a part of the first latching unit which projects from a second end of the housing opposite said first end and is mounted for translation with the biasing assembly;
- wherein the second latching unit comprises at least one latching dog mounted for translation on the housing, the housing being provided with a first hole for passage of the latching dog, and the first latching unit comprising a stop for latching engagement with the latching dog; and wherein the latching dog comprises a rod portion and a diametrically wider head portion adapted for latching engagement with the stop of the first latching unit, and wherein the second latching unit comprises a ring mounted on the housing and having a right part and a left part having respectively at least one right cavity and at least one left cavity, the at least one right cavity and at least one left cavity together forming at least one passage for the latching dog in a first position of the ring in which the right part and the left part abut against each other, the at least one passage communicating with the first hole in the housing and allowing the passage of the rod portion of the latching dog but forming a stop for the head portion which maintains the head portion in latching engagement with the first latching unit, the fail-safe shutdown system furthermore comprising biasing means for causing the right part and left part of the ring to move away from each other toward a second position in which the stop is able to lift the latching dog so as to enable the first latching unit to be moved toward the failsafe position under the effect of the biasing assembly.

33. The actuator according to claim 32, wherein the fail-safe shutdown system comprises electromagnetic means operatively linked to the biasing means so as to prevent separation of the right part and the left part of the ring under the action of the biasing means when the electromagnetic means is energized and allow separation of the right part and the left part under the action of the biasing means when the electromagnetic means is de-energized.

34. The actuator according to claim 33, wherein the second latching unit comprises two mobile support disks which are each mounted to a corresponding one of the right part and the left part of the ring around the housing, and the electromagnet means has a first portion and a second portion which are each arranged on a corresponding one of the mobile support disks, the first portion being attracted to the second portion when the actuator is energized, thereby making the latching dog rest against the first ramp of the first latching unit and preventing the right part and the left part from being separated.

35. The actuator according to claim 34, wherein the biasing means comprises at least one compression spring mounted perpendicularly to the mobile support disks so as to move the left part and the right part of the ring away from each other on de-energization of the electromagnetic means.

36. The actuator according to claim 32, wherein the stop on the first latching unit comprises a second ramp facing away from the first ramp and adapted to lift the latching dog when the first latching unit moves in a direction opposite to the movement toward the failsafe position, and wherein the second latching unit comprises at least one movement transformation element mounted for translation in a second hole in the housing, the movement transformation element having a lower end adapted to cooperate with a ramp of the first latching unit to lift the movement transformation element when the first latching unit moves in the direction opposite to the movement toward the failsafe position, and an opposite end adapted to cooperate with a notch of the ring when the movement transformation element is lifted by the first latching unit so as to cause the right part and the left part of the ring to move towards the first position and allow re-energization of the electromagnetic means.

37. The actuator according to claim 36, wherein the second latching unit comprises several movement transformation elements, including at least one right movement transformation element and at least one left movement transformation element, the movement transformation elements being arranged in zig zag fashion alternatively on the right part and the left part of the ring.

38. The actuator according to claim 37, wherein the first latching unit further comprises a third ramp facing the first ramp, and wherein on re-energization the second ramp of the first latching unit successively lifts the latching dog and the at least one right movement transformation element and the third ramp lifts the at least one left movement transformation element while the first latching unit moves in a direction opposite to the movement toward the failsafe position.

39. The actuator according to claim 32, wherein the second latching unit comprises at least one pin protruding from the housing and penetrating into a recess of one of the right and left parts of the ring to cooperate with said recess so as to limit the translation movement of the corresponding right or left part of the ring on the housing.

* * * * *